Nov. 21, 1950   H. GANG   2,531,208
PRODUCT TRANSFER MEANS
Original Filed Feb. 16, 1948   18 Sheets-Sheet 1

WITNESS:
George V. Hall

INVENTOR
Herman Gang
BY
Stuart Hilde
ATTORNEY

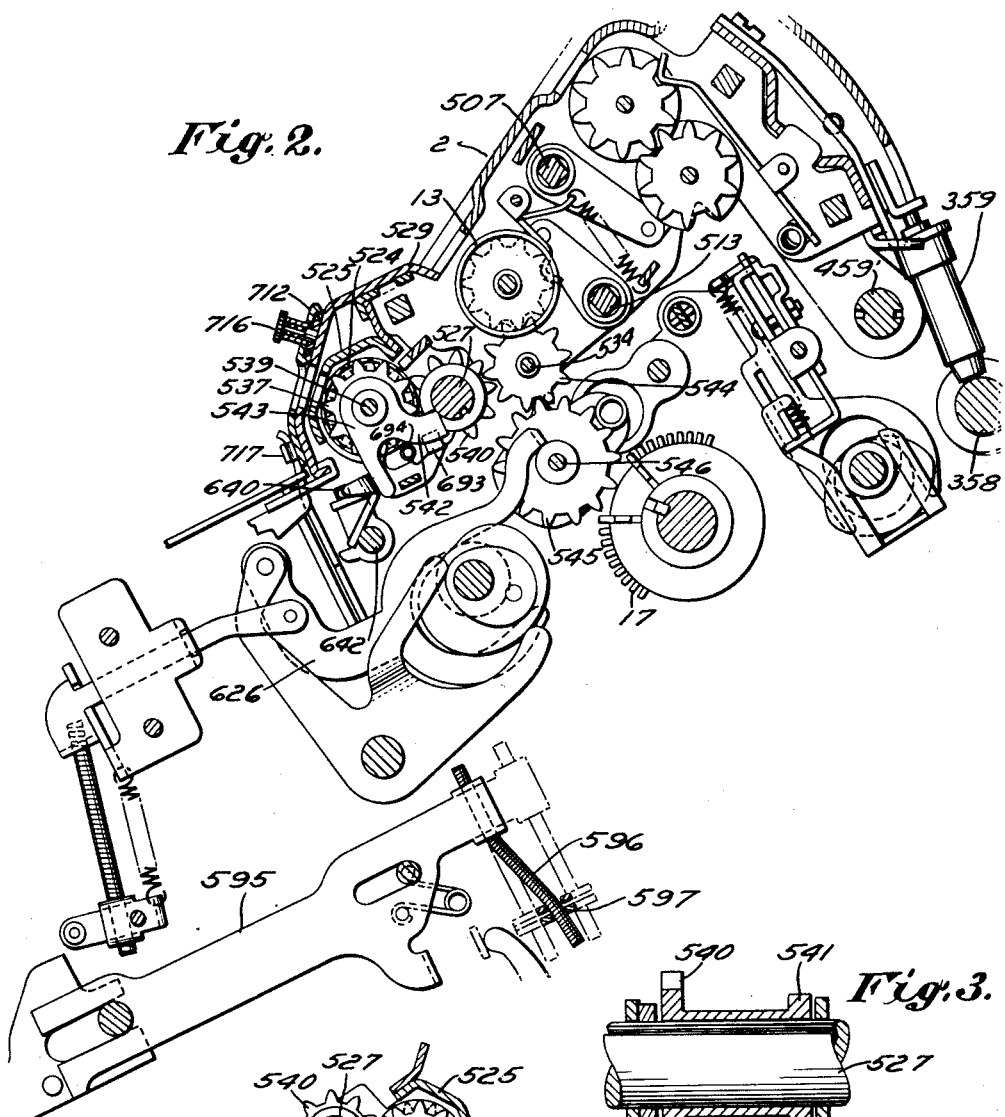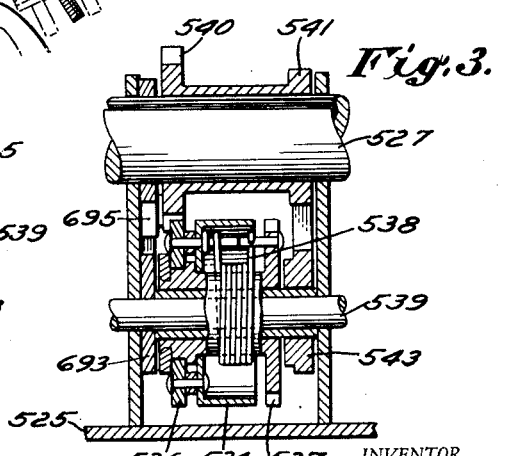

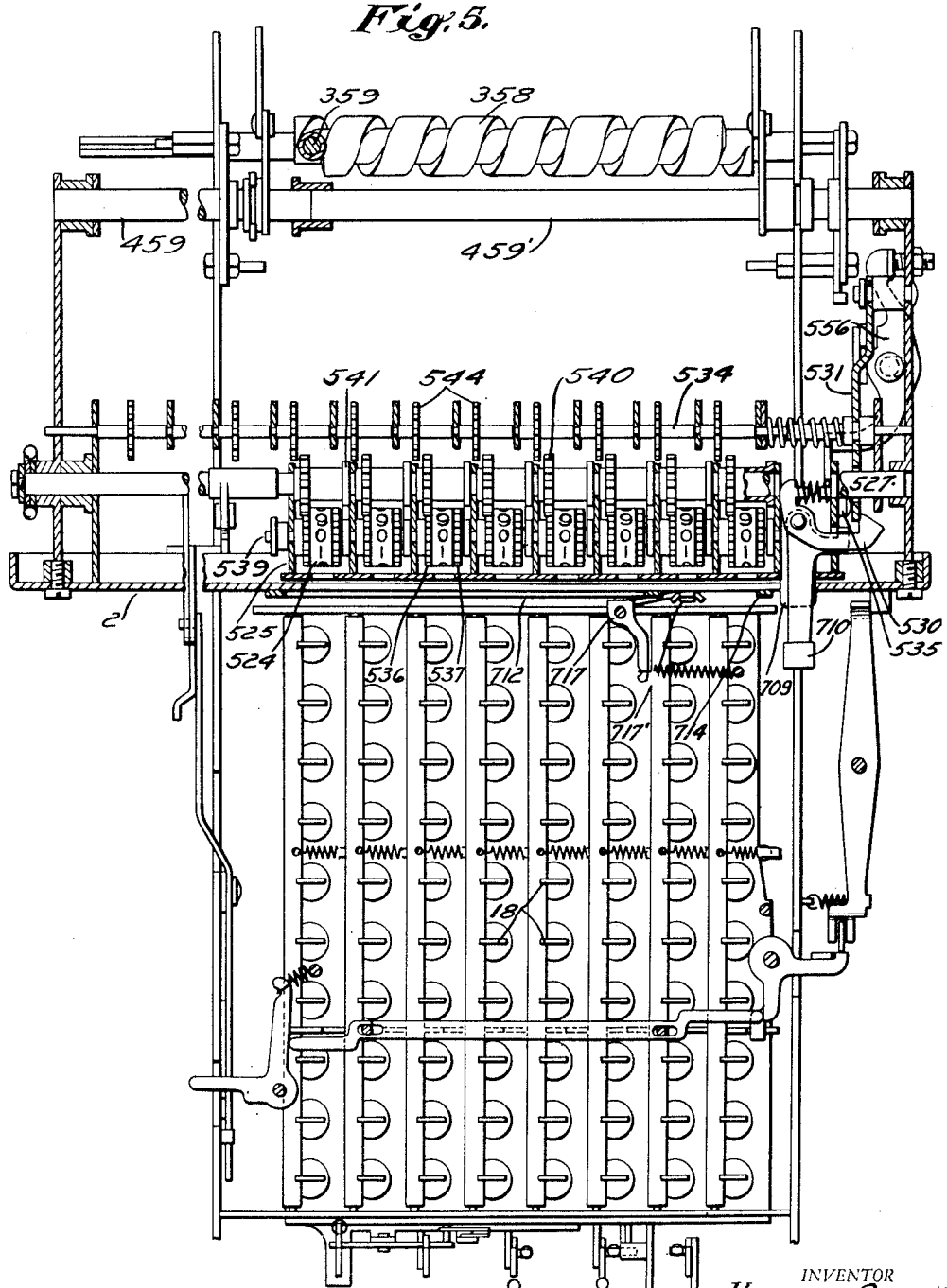

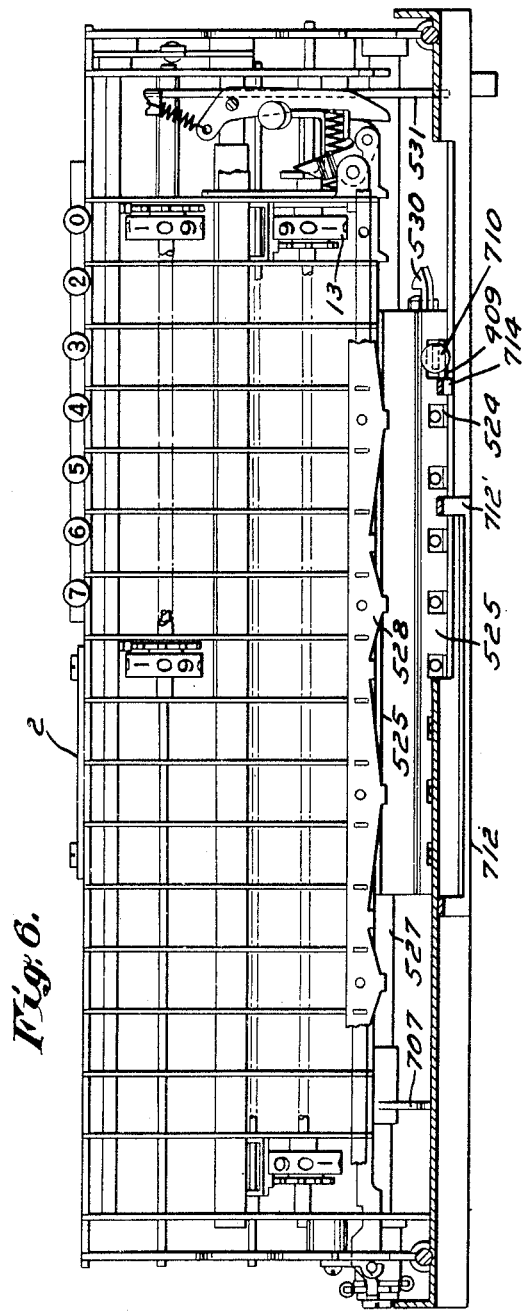

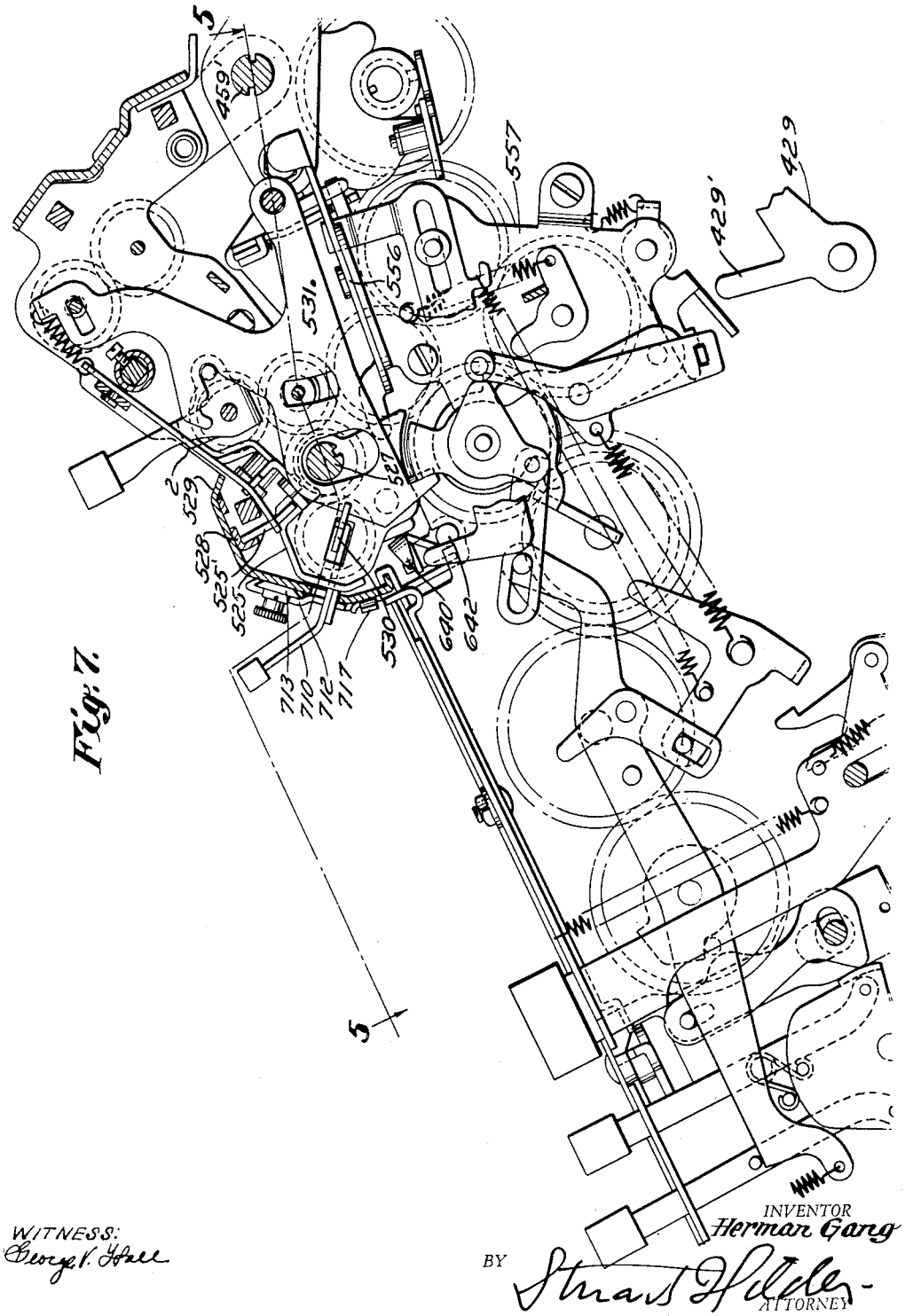

Nov. 21, 1950          H. GANG          2,531,208
PRODUCT TRANSFER MEANS

Original Filed Feb. 16, 1948          18 Sheets-Sheet 8

Nov. 21, 1950          H. GANG          2,531,208
PRODUCT TRANSFER MEANS
Original Filed Feb. 16, 1948          18 Sheets-Sheet 9

WITNESS:
George V. Hall

INVENTOR
Herman Gang
BY
Stuart Wilder
ATTORNEY

Nov. 21, 1950   H. GANG   2,531,208
PRODUCT TRANSFER MEANS
Original Filed Feb. 16, 1948   18 Sheets-Sheet 10
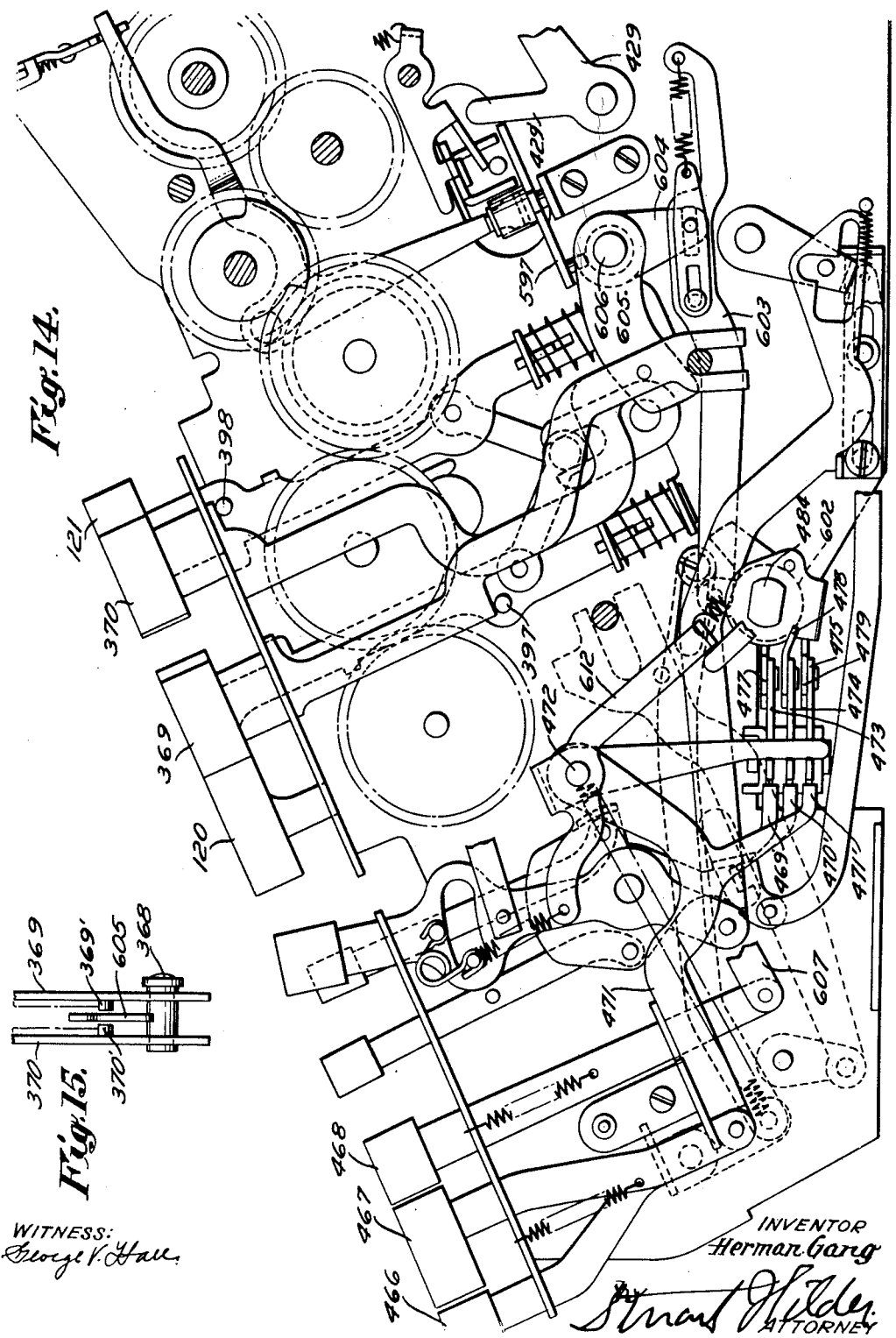

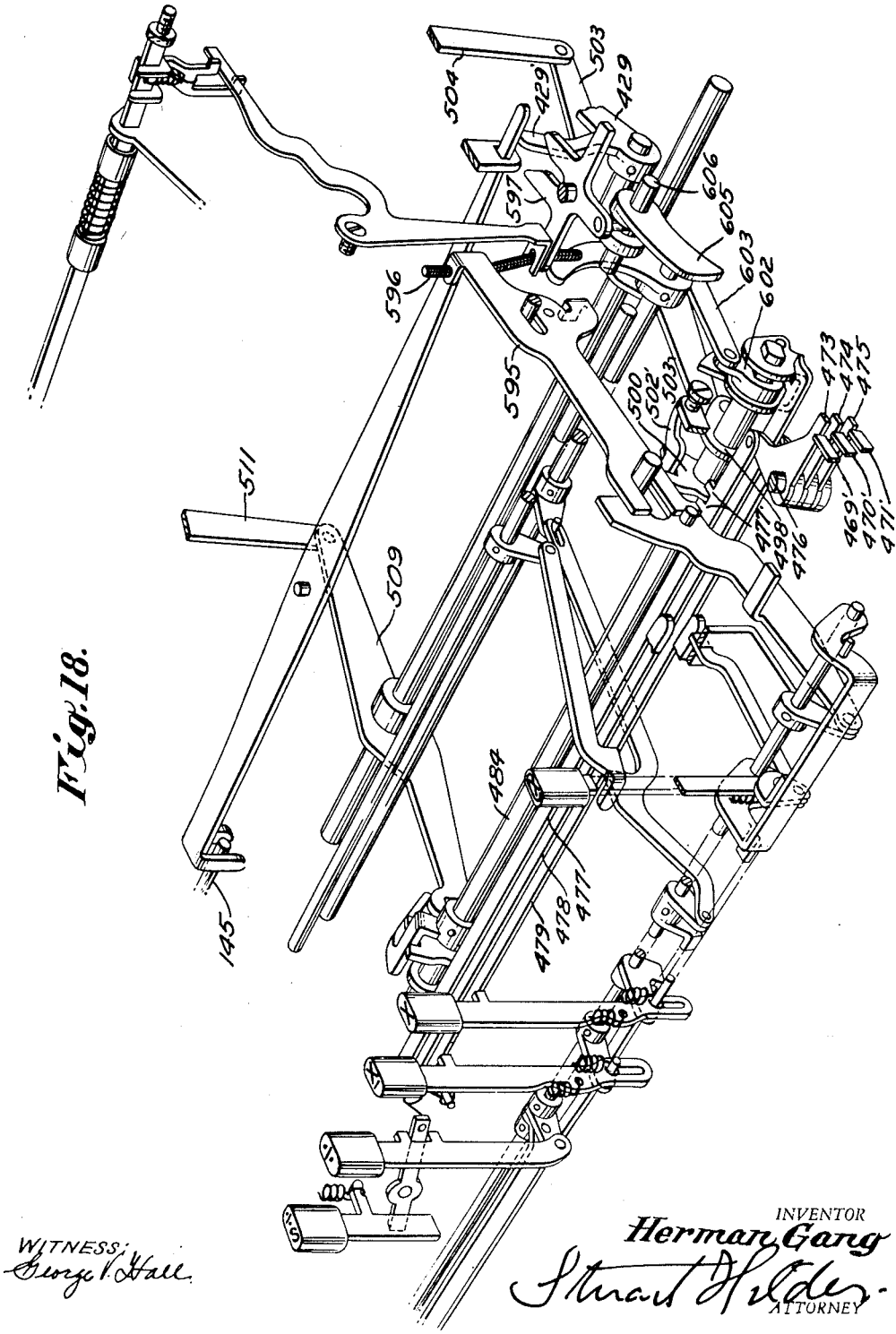

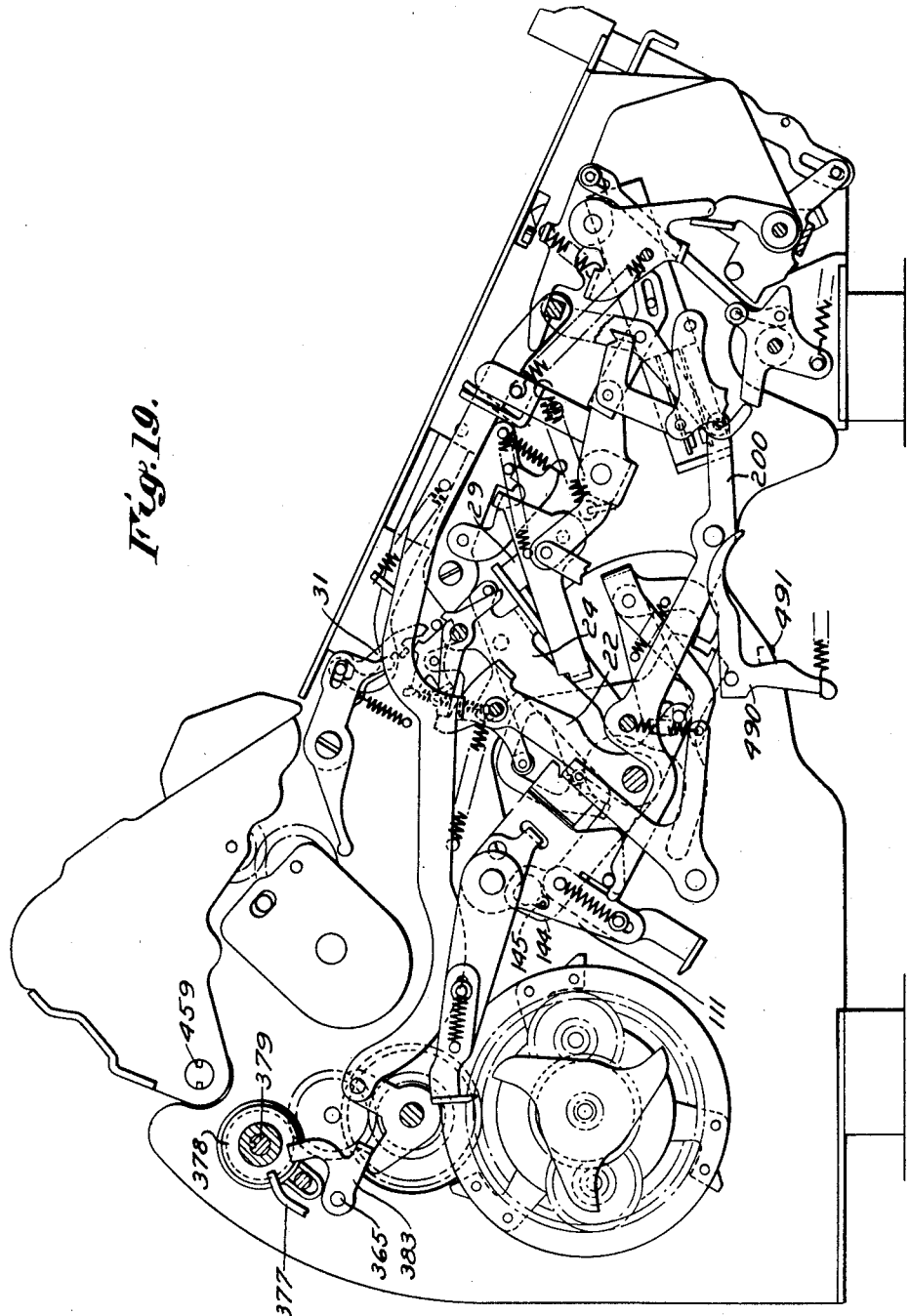

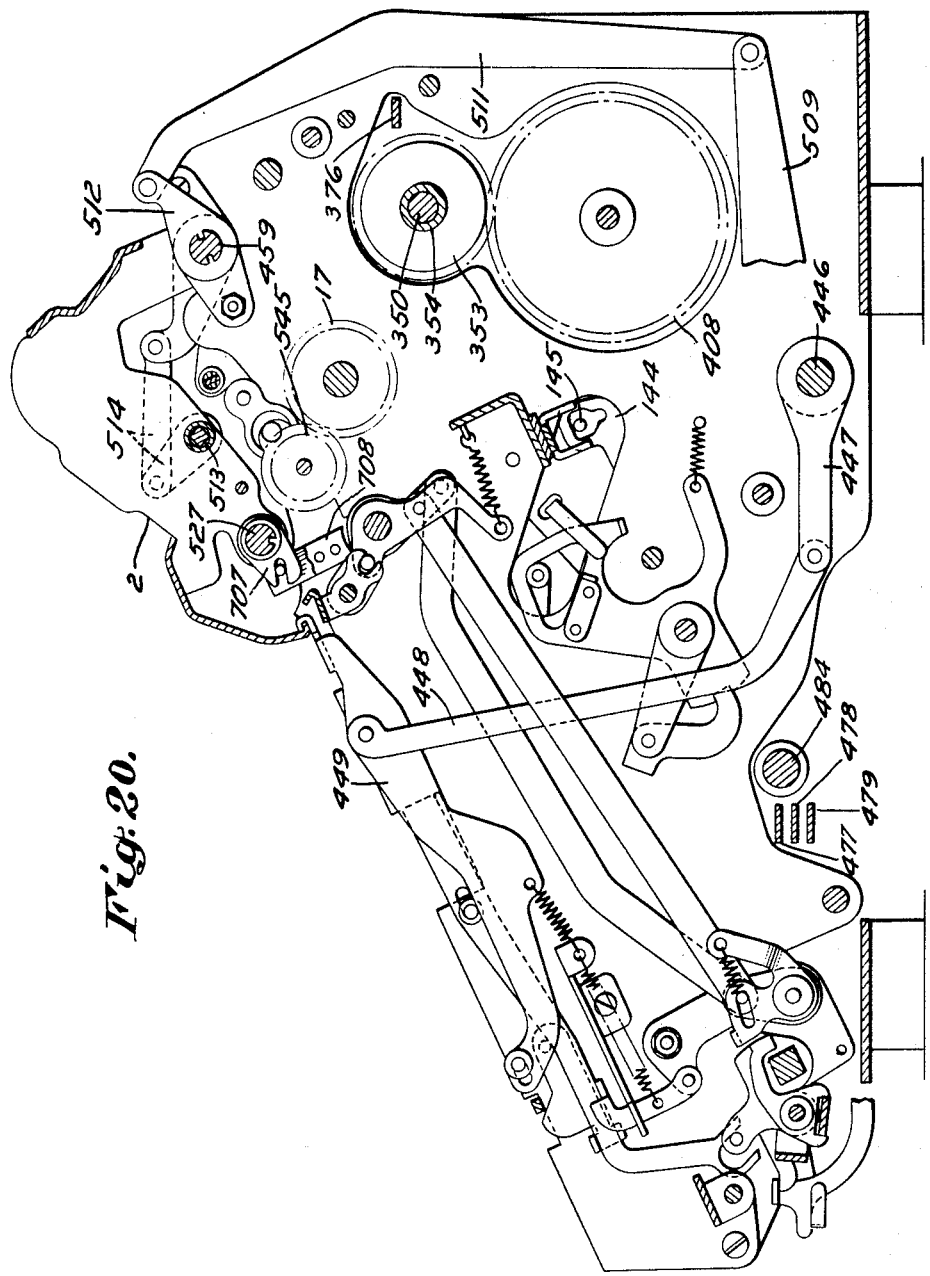

Nov. 21, 1950 H. GANG 2,531,208
PRODUCT TRANSFER MEANS
Original Filed Feb. 16, 1948 18 Sheets-Sheet 16
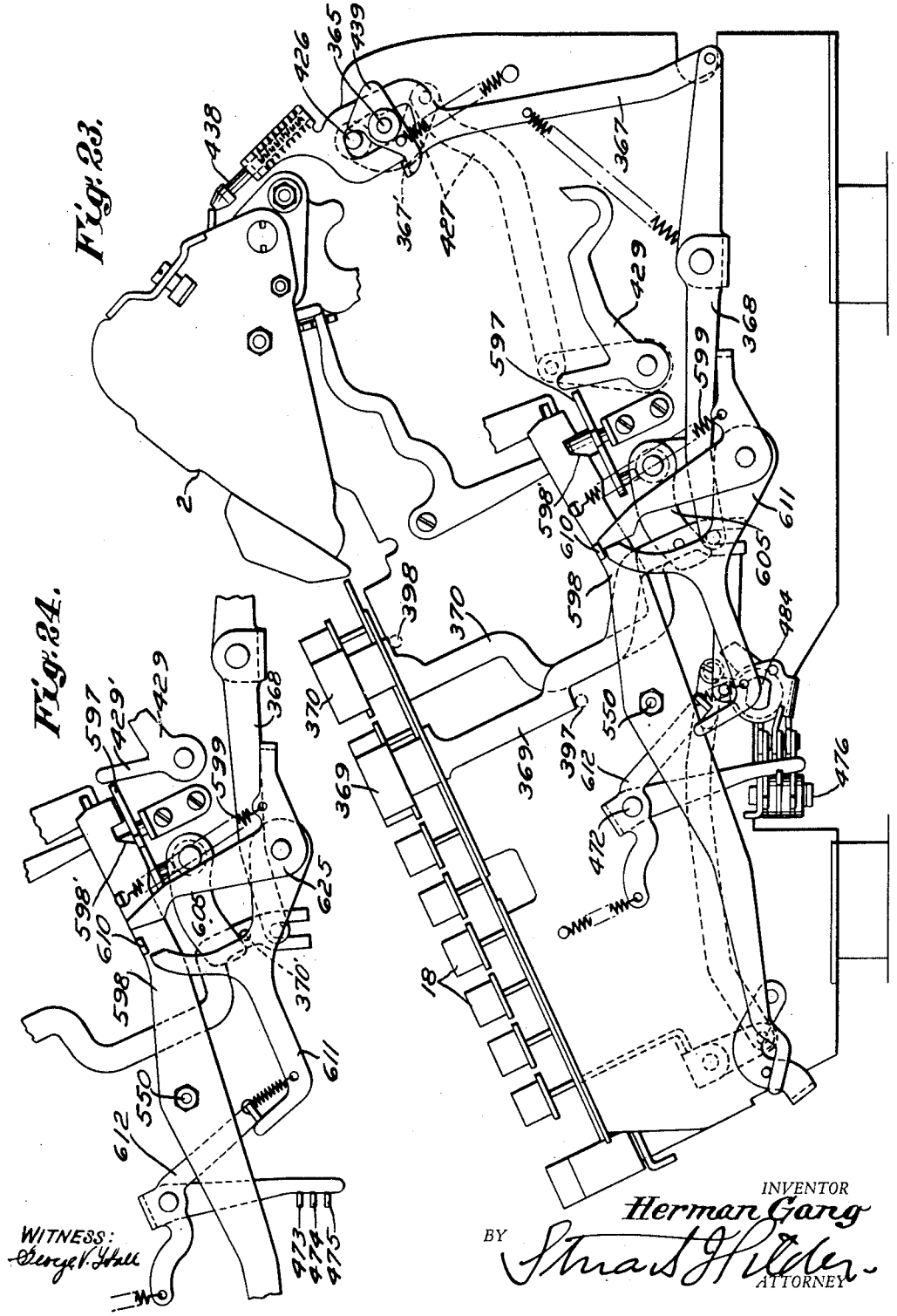

Nov. 21, 1950  H. GANG  2,531,208
PRODUCT TRANSFER MEANS

Original Filed Feb. 16, 1948  18 Sheets-Sheet 17

WITNESS:

INVENTOR.
Herman Gang
BY
ATTORNEY

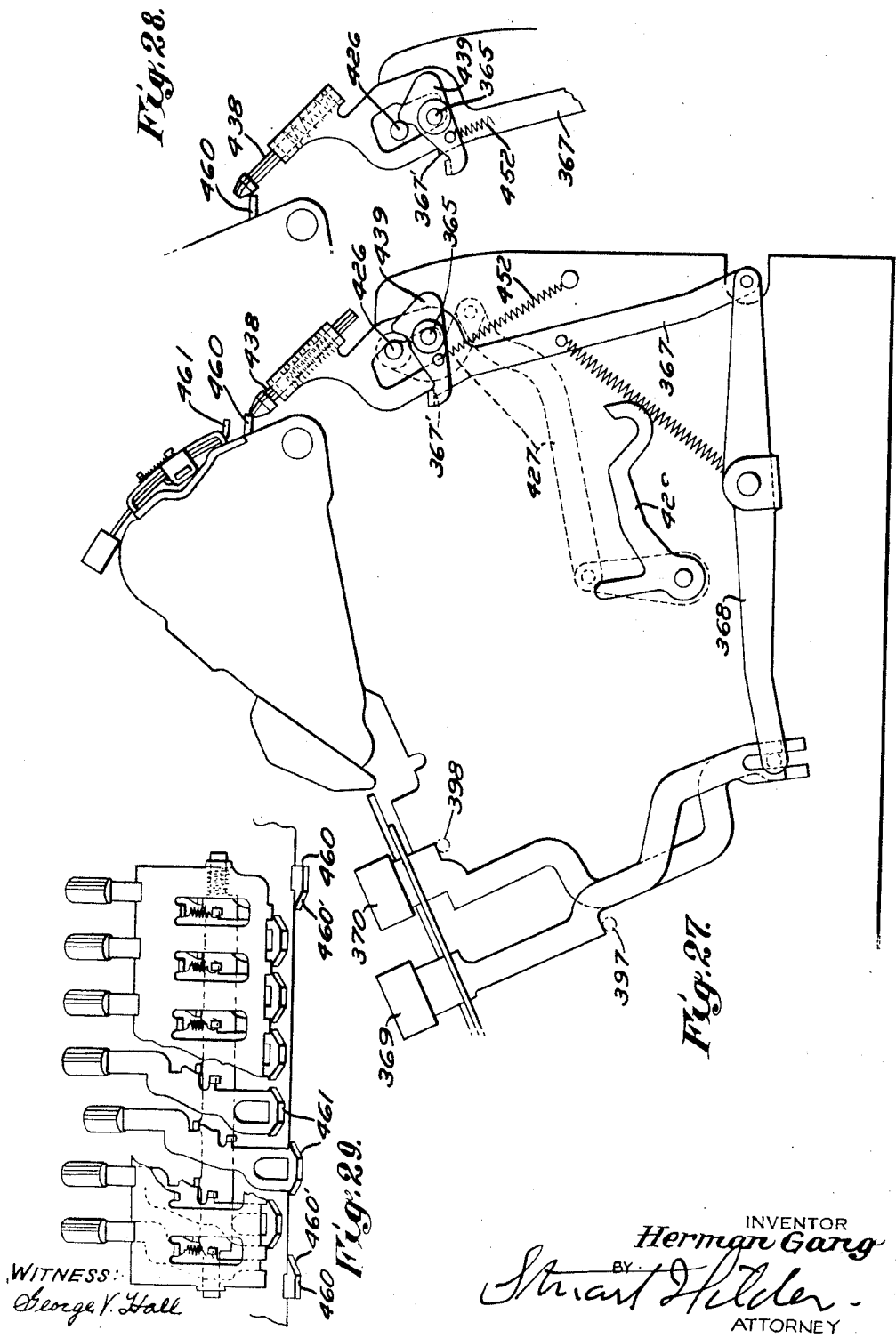

Patented Nov. 21, 1950

2,531,208

UNITED STATES PATENT OFFICE 2,531,208

PRODUCT TRANSFER MEANS

Herman Gang, Livingston, N. J., assignor to Monroe Calculating Machine Company, Orange, N. J., a corporation of Delaware Continuation of application Serial No. 8,546, February 16, 1948. This application November 2, 1948, Serial No. 57,943

8 Claims. (Cl. 235—63)

This invention relates to means whereby a product value may be transferred from the product register of a calculating machine to a series of multiplier storage wheels, so that said value may be used as a multiplier, to control a subsequent calculation. The present application is a continuation of application Serial Number 8,546, filed February 16, 1948, now abandoned.

The invention consists in the novel construction and combination of parts, as set forth in the appended claims.

In the accompanying drawings, illustrating an embodiment of the invention:

Fig. 2 is an enlarged vertical section through the main carriage showing the sub-carriage with the multiplier storage devices mounted therein, and the counting fingers for the storage devices and the multiplier register;

Fig. 3 is an enlarged detailed horizontal section of one of the multiplier storage wheels and gears;

Fig. 4 is a vertical section through the sub-carriage showing the pawls for holding the multiplier storage wheels and gears in adjusted position and cams for releasing the pawls;

Fig. 5 is a partial section taken substantially on the line 5—5 of Fig. 7 showing the sub-carriage in latched position in the main carriage and the keyboard with the cover plate and key buttons removed;

Fig. 6 is a plan view partially in section of the main carriage and showing the sub-carriage in an adjusted position;

Fig. 7 is an enlarged detailed right side elevation with the main carriage in section and showing the sub-carriage mounted therein in latched position;

Fig. 14 is an enlarged right side elevation showing portions of the controls for the clearout mechanism and controls for the carriage return mechanism;

Fig. 15 is a detailed elevation of the carriage shift key stems as viewed from the left;

Fig. 18 is a perspective view of portions of the clearout and control mechanisms with several of the parts in exploded relationship;

Fig. 19 is a left side elevation of the machine showing in part the differential drive mechanism and controls therefor;

Fig. 20 is a vertical section taken just inside the left hand side frame of the machine and showing certain linkage for the clearout mechanism and means for raising and lowering the main carriage;

Fig. 21 is a right side elevation of the machine showing the parts in their normal position;

Fig. 22 is a fragmentary detailed view showing certain of the parts illustrated in Fig. 21 in an operated position;

Fig. 23 is a right side elevation of the machine showing portions of the carriage return control devices in an operated position;

Fig. 24 is a fragmentary side elevation of certain of the parts shown in Fig. 23 in another operated position;

Fig. 27 is a right side elevation of the carriage shift keys and certain mechanisms associated therewith;

Fig. 28 is a fragmentary view showing certain parts illustrated in Fig. 27 in another position;

Fig. 29 is a fragmentary rear view of the main carriage.

*Transfer mechanism*

Figure 1:
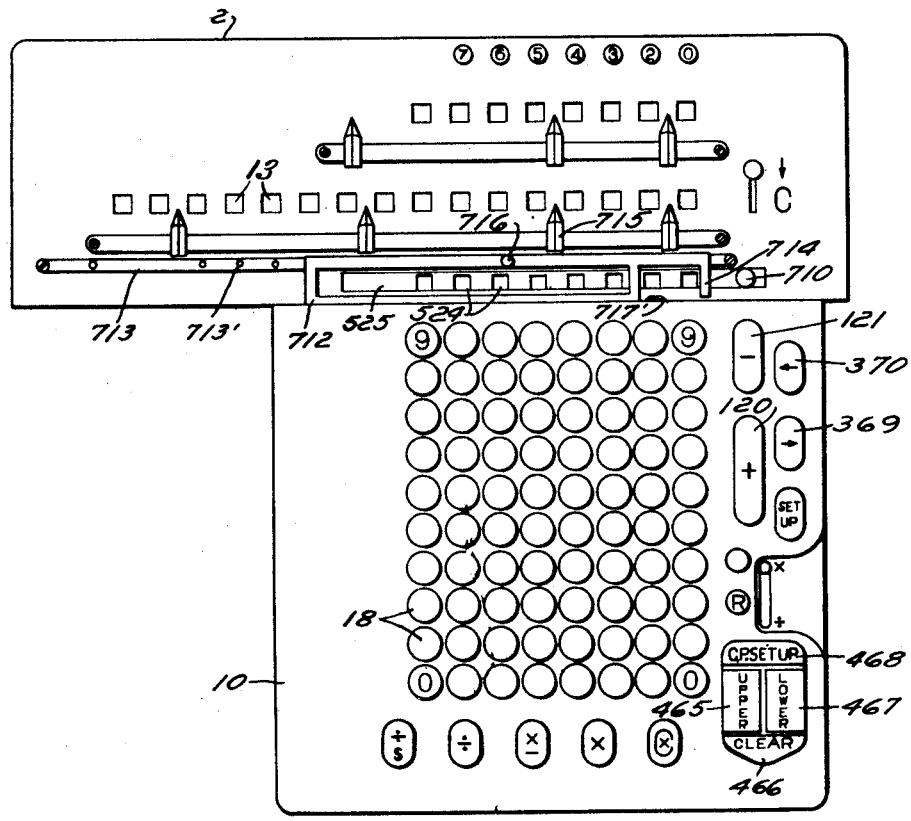
Fig. 1 is a plan view of a calculating machine built in accordance with the invention.

In accordance with the present disclosure, provision is made for the transfer of a value accumulated in a product register to multiplier storage devices of the machine. The value thus transferred may then be used as a multiplier and (the storage devices being counted back to zero in the course of the calculation) the resulting product may in turn be transferred to the storage devices for use as a multiplier. The multiplier storage devices are adapted to be moved from their normal position, out of engagement into driven engagement with the intermediate gears of certain of the wheels of the product register and upon a zero clearout operation of the register, the values accumulated therein are transferred to the multiplier storage devices. To this end, the denominational series of storage devices is mounted in a sub-carriage which is normally positioned at the front and to the extreme right in the main carriage. The sub-carriage, however, is longitudinally shiftable relative to the main carriage, and the storage devices are thereby adapted to be moved into and out of engagement with the intermediate gears of the product wheels mounted in the main carriage.

Manual adjustment of the sub-carriage toward the left, a distance determined by the setting of an adjustable stop, accordingly allows the storage devices to be moved into engagement with a like number of the denominational series of intermediate gears of the product wheels. This adjustment is intended to be made when the main carriage is in a shifted position to the right, as at the conclusion of a program of multiplication. When the transfer is effected by the clearout operation, the main carriage is automatically shifted to its extreme left hand position, in which another program of multiplication may be initiated. Furthermore, as the main carriage is shifted toward the left, the sub-carriage is automatically returned to its normal position to the right in the main carriage, with the storage devices out of driven connection with the product wheels and with the right hand device in the plane of movement of a counting finger which acts to control the product registering operation.

When the factors of the problem to be performed comprise whole numbers, the adjustable stop is set in its normal or rightmost position. The leftward adjustment allowed the sub-carriage thereby for the transfer operation will provide for the engagement of the units order storage device with the intermediate gear of the units order product wheel, the tens order with the tens order, etc. However, when the factors of the problem include a decimal, the adjustable stop is set to a position to the left, which position is determined as later described. When the adjustable stop is set to the first position to the left, the movement thereby allowed the sub-carriage for the transfer operation will provide for driven engagement of the rightmost order storage device with the intermediate gear of the second order product wheel from the right, etc. Thus it will be seen that the adjustable stop may be set so that a predetermined number of the product wheels, starting with the lowest order, will be to the right and out of driving connection with the storage devices when the sub-carriage is adjusted to the left for the transfer operation.

From the following description, it will appear that the proper setting of the adjustable stop will provide for the transfer of a value in the product register to the storage devices in proper relationship to a decimal marker, defined by the stop, when the sub-carriage is returned to its normal rightmost position. Also, when the main carriage is returned to its leftmost position in which a program of multiplication is to be initiated, the decimal marker defined by the stop will serve to mark the decimal setting of the multiplicand which is to be set on the keyboard. Furthermore, the product of the calculation thereafter performed will be correctly registered in relationship to a fixed decimal marker for the product register. Thus it will be seen that a series of multiplications may be performed, e. g., $(a \times b \times c$ etc.), and that the sum of the series will be registered in correct relationship to a fixed decimal marker on the product register.

*Multiplier storage devices*

The sub-carriage 525 (Figs. 1, 2, 3, 5 and 6) is slidably mounted on a splined shaft 527 located in the front of the main carriage 2. The shaft 527 extends the length of carriage 2 and is provided with suitable bearings in the end plates thereof. The sub-carriage is further supported by an upstanding strip 525' (Figs. 6 and 7) attached to and extending the length of the sub-carriage, the upper edge of the strip being positioned between depending lugs of a guide plate 528 attached to the underside of a cover plate 529 mounted on main carriage 2. The sub-carriage 525 is thus adapted for longitudinal movement relative to main carriage 2.

The sub-carriage 525 is provided with a latch 530 (Figs. 5, 6 and 7) which by engagement with plate 531 serves to hold the sub-carriage in its normal rightmost position within the main carriage. Plate 531 which is mounted in main carriage 2 further operates in connection with a set-up mechanism for the storage devices, which operation is fully disclosed in my co-pending application Serial No. 8,547, filed on February 16, 1948, which forms no part of the present invention. Latch 530 is biased in counterclockwise direction by a suitable spring (Fig. 5) and is pivotally mounted on a plate 709 which is fixed in sub-carriage 525 adjacent its rightmost end. Latch 530 extends to the right through a suitable opening in the right hand end plate of the sub-carriage where it is brought into latching engagement with plate 531. The fixed plate 709 extends outwardly toward the front of the machine through a suitable opening at the front of the sub-carriage and thereby serves a further purpose to be described.

A lever 710 (Figs. 5, 6 and 7) pivotally mounted at a common point with latch 530 also extends outwardly toward the front of the machine through the same opening with fixed plate 709. Lever 710 (Fig. 5) is provided with a rightwardly extending arm which has an upstanding lug adapted for engagement with the rearward edge of latch 530. Accordingly, it will be seen from an inspection of Fig. 5, that when lever 710 is manually moved toward the left, it will be rocked clockwise and the lug thereof will also rock latch 530 clockwise against the tension of its spring thereby removing the latch from engagement with plate 531. Lever 710 is prevented from further clockwise movement by contact with the left hand edge of the slot in sub-carriage 525 through which it extends. However as latch 530 is removed from engagement with plate 531, further movement of lever 710 toward the left (Fig. 6) will also move sub-carriage 525 a like distance longitudinally of main carriage 2. When main carriage 2, however, is in its leftmost position a lock lever 556 (Figs. 5 and 14) prevents sub-carriage 525 from being moved from its normal position and main carriage 2 must be shifted toward the right before the sub-carriage can be moved.

Lock lever 556 (Fig. 5) is pivotally mounted on an outwardly extending shelf of a plate 557 (Fig. 7) which is mounted on the outer face of the right hand side frame of the machine. A rearwardly extending arm of lever 556 is provided with an upstanding lug (Figs. 5 and 7) which is contacted by a stud extending inwardly from the right hand end plate of the main carriage, thus urging the forward end of the lever to the right when carriage 2 is in its leftmost position. The forward end of lever 556 is provided with an upstanding ear which is in contact with the inner face of the right hand end plate (Figs. 5 and 7) of sub-carriage 525. Thus it will be seen that the ear of lock lever 556 prevents sub-carriage 525 from being moved to the left longitudinally of the main carriage when the main carriage is in its leftmost position. It will be apparent, however, that when the main carriage is shifted to the right, the right hand end plate of sub-carriage 525 will be moved an equal distance to the right of the ear of lever 556.

When sub-carriage 525 is in normal latched relation with plate 531, it is further held in fixed position relative to the main carriage by a stud 535 (Fig. 5). Stud 535 is mounted in and extends to the right of the right hand end plate of the sub-carriage, and by abutment with plate 531 prevents the sub-carriage from being moved to the right beyond its latched position.

When carriage 2 is shifted back toward the left after a transfer, as will hereinafter be described, the right hand end plate of sub-carriage 525 will be moved into contact with the nose of lock lever 556 (Fig. 5). Lock lever 556 will therefore be moved clockwise until blocked from further movement by the side frame of the machine. Sub-carriage 525 will now be blocked from further leftward movement and main carriage 2 will continue its leftward shift independently thereof by reason of the slidable mounting of the sub-carriage therein. When the main carriage approaches its leftmost position, the stud on the right hand end plate thereof will contact the lug at the rearward end of lock lever 556 thus moving the lever in counter clockwise direction. The nose of lever 556 will therefore move sub-carriage 525 to the right and when the main carriage 2 is shifted to its leftmost position, latch 530 will engage plate 531 thus latching the sub-carriage in its normal position relative to the main carriage.

Figure 8:
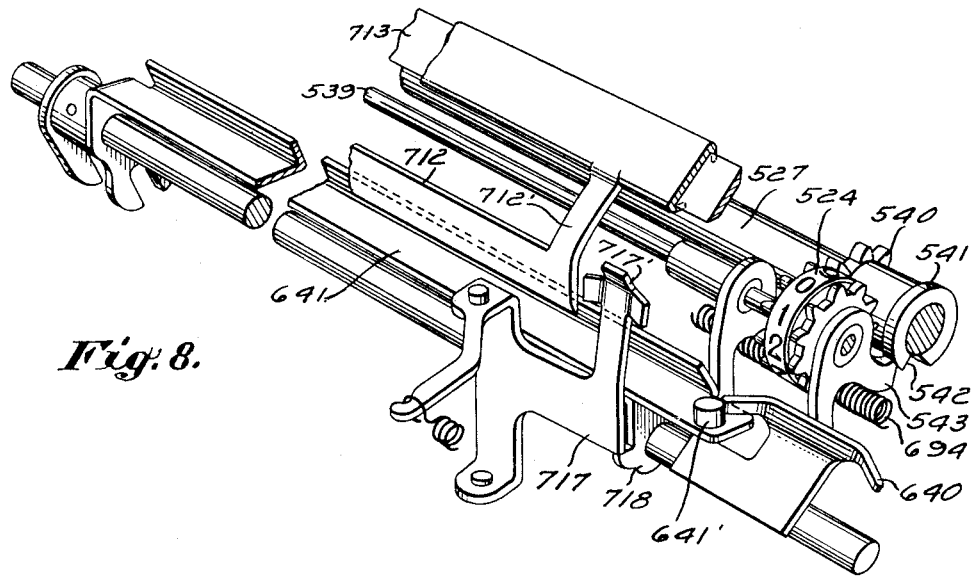
Fig. 8 is a fragmentary perspective showing the adjustable slide in relative position to the latch which operates in connection with the main carriage shift.

The multiplier storage wheels 524 (Figs. 3 and 5) are located at the front of the sub-carriage 525 and are fixed to gears 536 to the left thereof (Figs. 3 and 5) by suitable rivets. The wheels 524 and gears 536 are rotatably mounted as units on sleeves provided with gears 537 integral therewith and located to the right of said wheels. The gears 537 have yieldable spring connections 538 with the wheels 524 for a purpose fully disclosed in my co-pending application Serial No. 8,545, filed on February 16, 1948, and form no part of the present invention. Gears 536, wheels 524 and gears 537 are therefore normally adapted to be rotated as units on the shaft 539 extending the length of the sub-carriage 525. Located to the rear and in constant mesh with the gears 536 are the multiplier storage gears 540 (Figs. 2, 3, and 5) which are rotatably mounted on the splined shaft 527 on which the sub-carriage 525 and the parts therein contained are shifted as a unit longitudinally of the main carriage 2. The gears 540 are provided with rightwardly extending hubs 541 (Figs. 3, 5, and 8) terminating in end portions of slightly larger diameter. The hubs 541 are provided with recesses 542 (Figs. 2 and 8) which are adapted for registration with fingers 543 which are rotatably mounted on the shaft 539. When the value is set in a storage gear 540, the co-operating finger 543 will ride on the periphery of its hub 541, and when the storage gear is counted back to zero, as will hereinafter be described in connection with multiplication, the finger will be urged into the recess 542.

Storage gears 540 are normally held in adjusted position by click pawls 693 (Figs. 2 and 4) rotatably mounted on shaft 539 and located to the left of gears 536 (Fig. 3). Click pawls 693 are biased counterclockwise (Fig. 2; clockwise Fig. 4) by a spring 694 extending the length of sub-carriage 524 and threaded through suitable openings in the partition plates thereof, and said pawls are provided with square lugs (Fig. 2) extending to the side from the ends thereof and adapted for engagement with the teeth of storage gears 540. Cams 695 (Figs. 3 and 4) are splined on shaft 527 and are normally in counterclockwise position from the showing in Fig. 4 and when in normal position allow engagement of pawls 693 with storage gears 540 (Fig. 2). However, as will be described, when carriage 2 is rocked in any one of the clear out operations, splined shaft 527 is rocked clockwise and thereby will rock pawls 693 counterclockwise and out of engagement with storage gears 540 as shown in Fig. 4.

Figure 10:
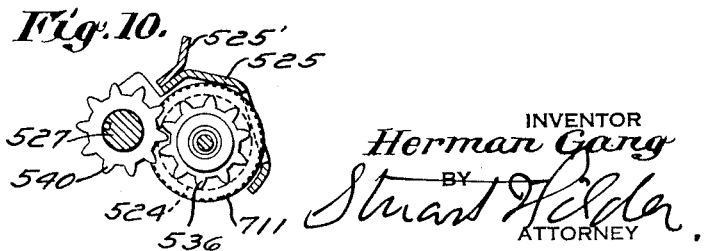
Fig. 10 is a vertical section through the sub-carriage showing how a twirler knob for the manual adjustment of a multiplier storage device could be employed.
Figure 11:
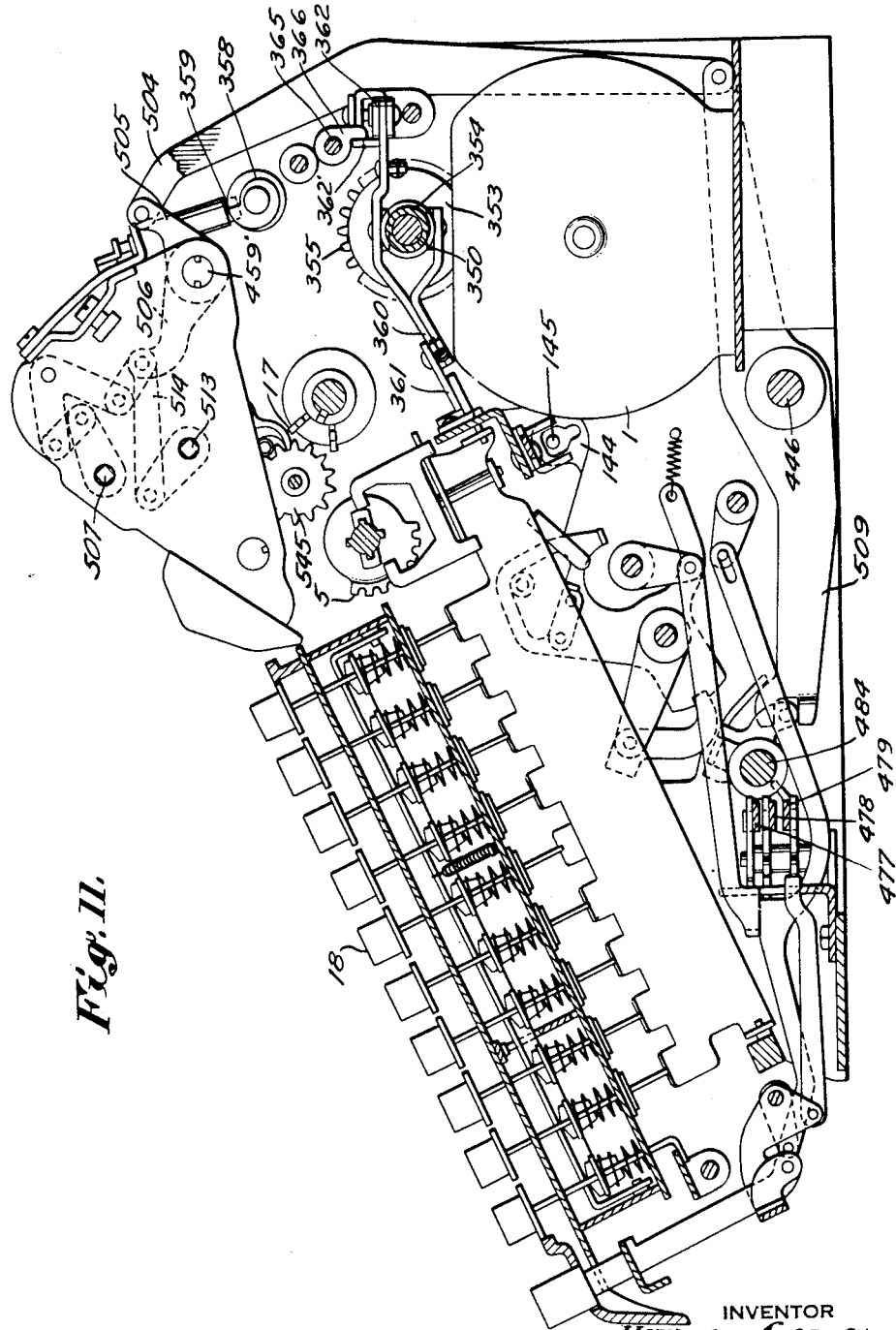
Fig. 11 is a vertical section showing the keyboard for selecting a value, and a portion of the carriage shift mechanism.

The intermediate gears 544 (Figs. 2 and 5) which are in constant mesh with the gears of the numeral wheels 13, of the product register, are rotatably mounted in the main carriage 2 to the rear of sub-carriage 525 upon shaft 534 extending the length of the main carriage. The gears 544 are driven by intermediate gears 545 rotatably mounted on a shaft 546 extending between the side plates of the machine, these gears 545 being driven by the digital actuators 5 and the tens transfer actuators 17 (Fig. 11). Aside from the transfer of an accumulated product, a multiplier value may be set in the storage wheels 524 and gears 540 by other suitable means, for instance, in the manner fully disclosed in my co-pending application Serial No. 8,547, hereinbefore referred to. However, as the set-up means forms no part of the present invention, an alternative manually operable and simplified means is shown in Fig. 10, wherein each storage wheel 524 is provided with a twirler knob 711 integral therewith. The twirler knobs are of slightly larger diameter than wheels 524 and thereby extend outwardly through suitable openings a slight distance exteriorly of the front of sub-carriage 525 so that they are accessible for manipulation by the operator. The peripheries of the twirler knobs are provided with knurling, as shown in Fig. 10 for ease of operation, and suitable openings (Figs. 1 and 6) are provided in the subcarriage so that the operator may observe the settings of the storage wheels.

The multiplier storage devices described in the foregoing are adapted for operation in connection with a program of multiplication initiated and controlled, for example, in the manner fully disclosed in my co-pending application Serial No. 8,548, filed on February 16, 1948, herewith. In the aforesaid application, the storage wheels 524 and gears 540 are successively counted back to zero by a counting finger 626 (Fig. 2) starting with the rightmost wheel and gear, with main carriage 2 in its leftmost position.

A bail 640 (Figs. 2, 7 and 8) pivotally mounted in the main body of the machine in alignment with the counting finger 626, controls registration and rightward carriage shift. Fingers 543 (Fig. 8) one for each storage gear 540 are successively brought into registration with bail 640 as the main carriage 2 is shifted from order to order. If there is a value in the related storage gear, finger 543 will move bail 640 in counterclockwise direction (Fig. 8), initiating registration. When the storage gear is counted back to zero, finger 543 will allow the bail to be rocked clockwise to initiate a carriage shift toward the right.

A second bail 641 (Fig. 8), pivotally mounted on the same shaft with bail 640, serves to stop the machine when the last storage gear 540 containing a value is counted back to zero. Bail 641 is adapted for engagement with the fingers 543 of all of the storage devices to the left of the one in engagement with bail 640. Thus if there is a value in any one of these storage gears bail 641 will be held in counterclockwise rocked position and the operation of the machine will continue, either as registration or as carriage shift. Furthermore, bail 640 is provided with a leftward extension which by contact with a pin 641' (Fig. 8) in bail 641 will hold bail 641 in counterclockwise rocked position if bail 640 is so held by finger 543, thus continuing the operation of the machine. When all of the storage devices, however, are counted back to zero, bail 641 will be allowed clockwise movement and the machine will be brought to rest.

Figure 9:
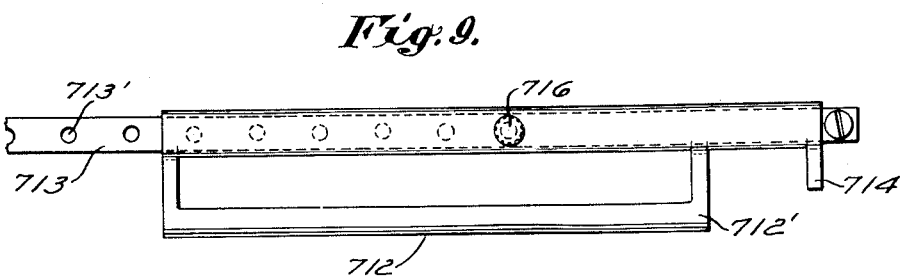
Fig. 9 is a plan view of the adjustable slide which determines the adjustment of the sub-carriage for the transfer operation.

An adjustable slide 712 (Figs. 1, 2, 5, 6 and 9) is mounted on a rail 713 which is fixed on the outer face of cover plate 529 of main carriage 2. Slide 712 serves as a stop to determine the manual adjustment of sub-carriage 525 to the left in the main carriage for the transfer operation. Slide 712 is provided with a spring urged, manually retractible plunger 716 (Figs. 2 and 9) which is adapted for engagement with one of a series of spaced holes 713' in rail 713, whereby the slide is held in adjusted position. Slide 712 is provided with a depending finger 714 (Figs. 1, 5 and 6) which is in the path of fixed plate 709 extending outwardly from sub-carriage 525. It will therefore be apparent that when sub-carriage 525 is moved to the left by lever 710, plate 709 will be brought into contact with finger 714 thereby preventing the sub-carriage from further movement and locating it in the proper position.

It will be observed that in Figs. 1 and 5 slide 712 is in its rightmost adjusted position and main carriage 2 in its leftmost position. When slide 712 and carriage 2 are thus positioned, finger 714 is positioned to the right of the units order storage wheels 524 and to the right of the units order keys 18 on the keyboard. This finger 714 is intended to serve as a decimal marker and therefore a multiplier set in the storage devices and a multiplicand on the keyboard are considered as whole numbers.

Carriage 2 is shifted toward the right in the performance of a multiplying calculation and at the conclusion thereof is brought to rest. The operator may now move sub-carriage 525 to the left by lever 710. It will be noted from Fig. 5 that finger 714 is positioned a distance to the left of plate 709 which will permit sub-carriage 525 to be moved sufficiently to engage the units order storage gears 540 with the intermediate gear 544 of the units order product wheel 13, the tens order with the tens order, etc. It will be recalled, however, in connection with the multiplication controls that when the last storage device containing a value is counted back to zero, the machine will be brought to rest without further shift of carriage 2. It will be apparent, therefore, that under certain conditions, for example, if a value is set only in the rightmost storage device, no carriage shift would be effected and sub-carriage 525 would be blocked from leftward movement by lock lever 556 (Fig. 5). Accordingly, it is necessary to make provision for carriage 2 to be shifted far enough to the right during a calculation so that lock lever 556 will be ineffective to prevent leftward movement of carriage 525 a sufficient distance to engage finger 714.

To insure that carriage 2 will be shifted far enough to the right, a latch 717 (Figs. 1, 2, 5, 7 and 8) is pivotally mounted at the rear of the keyboard. Latch 717 extends to the right (Figs. 5 and 8) and is provided with an upwardly extending arm provided at its free end with a tab member 717'. Tab 717' is provided with a pair of forwardly bent lugs extending from either side thereof respectively. Latch 717 is biased in counterclockwise direction by a suitable spring and thus tab 717' is normally urged against main carriage 2 and is in sliding relation therewith when the carriage is shifted. Latch 717 engages a lug 718 (Fig. 8) of bail 641 when tab 717' is in contact with main carriage 2 thus holding the bail in counterclockwise position. Therefore in a program of multiplication, even though all of the multiplier devices have been counted back to zero, bail 641 will be prevented from clockwise movement as long as latch 717 engages lug 718. Carriage 2 will therefore be shifted to the right until bail 641 is released by latch 717 as follows:

Slide 712 is provided with a depending extension 712' (Figs. 1, 5, 8 and 9) which is provided with a rectangular opening to prevent obscuring of storage wheels 524. Extension 712' is located a slight distance to the left (Figs. 1 and 5) of tab 717' when slide 712 is set in its rightmost position and main carriage 2 is in its leftmost position. Therefore, when carriage 2 is shifted to the right, extension 712' will contact tab 717', thus rocking latch 717 clockwise, thereby releasing bail 641 which will be moved clockwise to terminate the shift if there is no value in any of the storage devices. When slide 712 is set to the left for decimal adjustment, carriage 2 must therefore be shifted an equivalent distance to the right before extension 712' is effective to release latch 717. Accordingly, it will be seen, that in a program of multiplication carriage 2 will always be shifted far enough to the right so that sub-carriage 525 may be moved to the left against finger 714 without interference from lock lever 556. It will be understood, however, that the storage devices and transfer arrangement may be used in connection with a multiplication control in which carriage 2 is shifted to the rightmost position during each product registration, as in many prior art devices. In such case, latch 717 would be unnecessary to insure carriage shift far enough to effect the transfer.

When a problem to be calculated includes a decimal, slide 712 is set to the left on carriage 2 to the position in which finger 714 thereof is to the left of the number of orders of storage wheels 524 which will include the desired number of decimals to be transferred from the product register. For example, if two decimal places is considered sufficient for the calculation, slide 712 is moved two places toward the left and held in that position by plunger 714 in registration with the third hole 713' from the right on slide 713. Thus finger 714 will be located to mark the decimal between the second and third storage wheels 524 from the right on sub-carriage 525. Also when main carriage 2 is in its leftmost position, finger 714 will be located to mark the decimal between the second and third columns of keys 18 from the right on the keyboard. As the decimal of the product is the sum of the decimals of the factors, decimal marker 715 (Fig. 1) is accordingly positioned between the fourth and fifth wheels 13 from the right of the product register. With slide 712 set in accordance with the foregoing and carriage 2 set in its leftmost position, a problem such as for example $(a \times b = c)$ and in which the product $c$ is to be transferred from the product register to the multiplier storage devices, is accomplished as follows:

For example, if $(a = .94)$ and $(b = 12.24)$, the .94 is set in the two multiplier wheels 524 to the right of finger 714 of slide 712. The 12.24 is set in the four rightmost keyboard columns; the finger 714 therefore indicating the decimal between 12 and 24. When the multiplier wheels 524 and gears 540 have been counted back to zero the product 115,056 will be registered on the six rightmost wheels 13 of the product register with the decimal marker 715 (Fig. 1) between 11 and 5056. Sub-carriage 525 is then moved to the left by lever 710 as far as permitted. It will be recalled that slide 712 has been moved two places to the left and therefore the sub-carriage is moved until fixed plate 709 thereof is brought into contact with finger 714 (Fig. 6) thereby preventing further leftward movement of the sub-carriage and moving storage gears 540 into engagement with the proper intermediate gears 544 (Fig. 5). It will readily be seen that by this movement of the sub-carriage the rightmost storage gear 540 is moved past the two rightmost intermediate gears 544 and finally into engagement with the third intermediate gear 544 from the right; and also the other storage gears are likewise each moved past two intermediate gears and into engagement with the next intermediate gear to the left. Considering the decimal setting as indicated by finger 714 when carriage 2 was in its leftmost position at the start of the problem, it will be seen that the units order storage gear is in driven engagement with the units order wheel 13 of the product register, the tens with the tens, etc., comprising the whole numbers. Also, the tenths order storage gear 540 will be in driven engagement with the tenths order wheel 13, etc., comprising the decimals.

It will be observed that the hundredths and thousandths order wheels 13 (Fig. 6) are to the right of sub-carriage 525 and out of engagement with the storage gears, and the values therein will not be transferred to the storage devices. When wheels 13 are cleared, the value 1150 will therefore be transferred to the four rightmost multiplier storage wheels 524 and gears 540, the 56 in the rightmost wheels being dropped. When main carriage 2 is returned to its leftmost position, sub-carriage 525 will be restored to its normal latched position and the finger 714 will correctly mark the decimal between the 11 and 50. It will thus be seen that the operation may be repeated a number of times determined by the capacity of the machine in terms of product dials located to the left of a fixed decimal point, and that the decimal will always be correctly indicated both in the product and in the transferred multiplier.

*Clearout mechanism*

Figure 12:
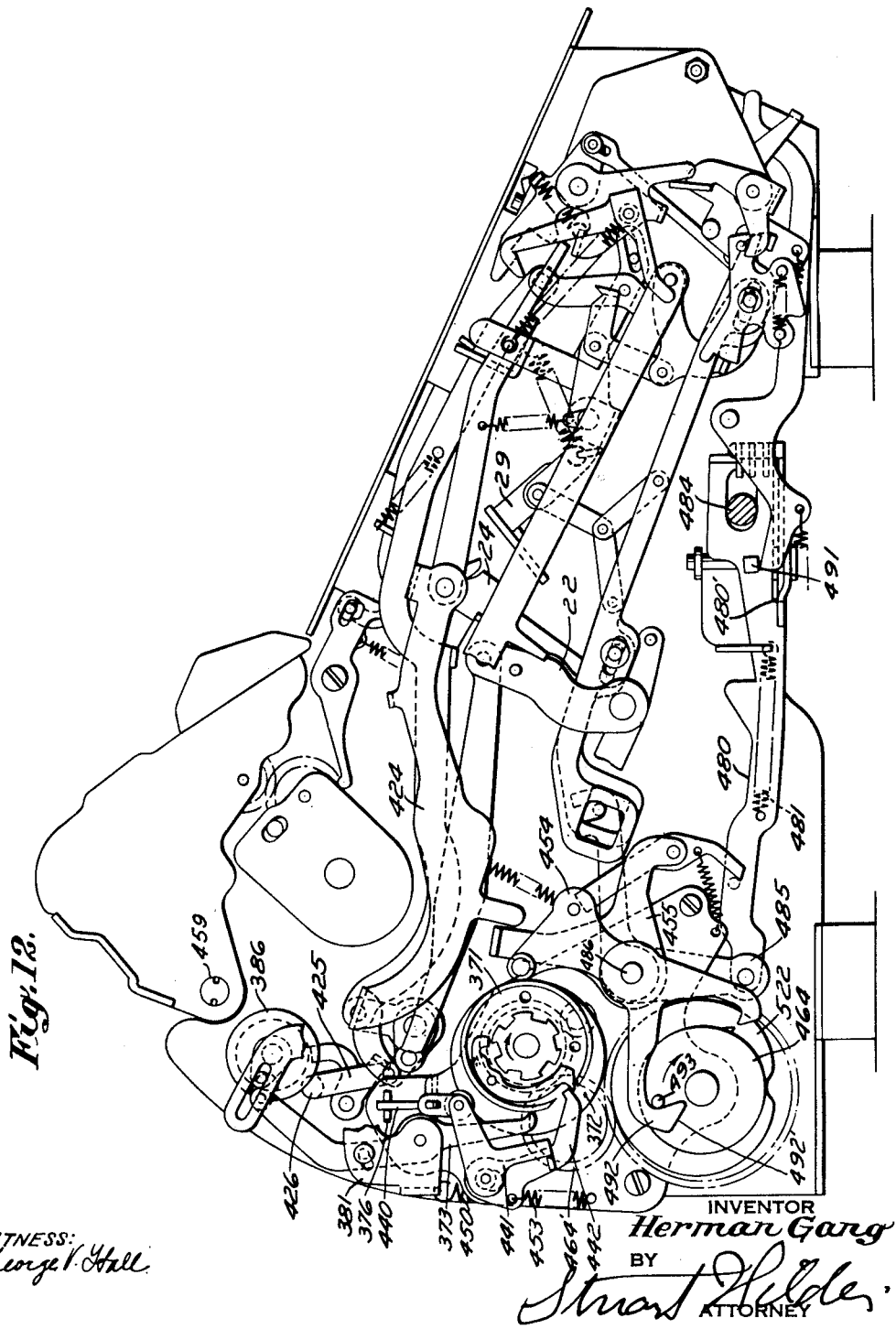
Fig. 12 is a left side elevation of the machine showing the clearout clutch and the two phase carriage shift control clutch and various mechanisms associated therewith.
Figure 16:
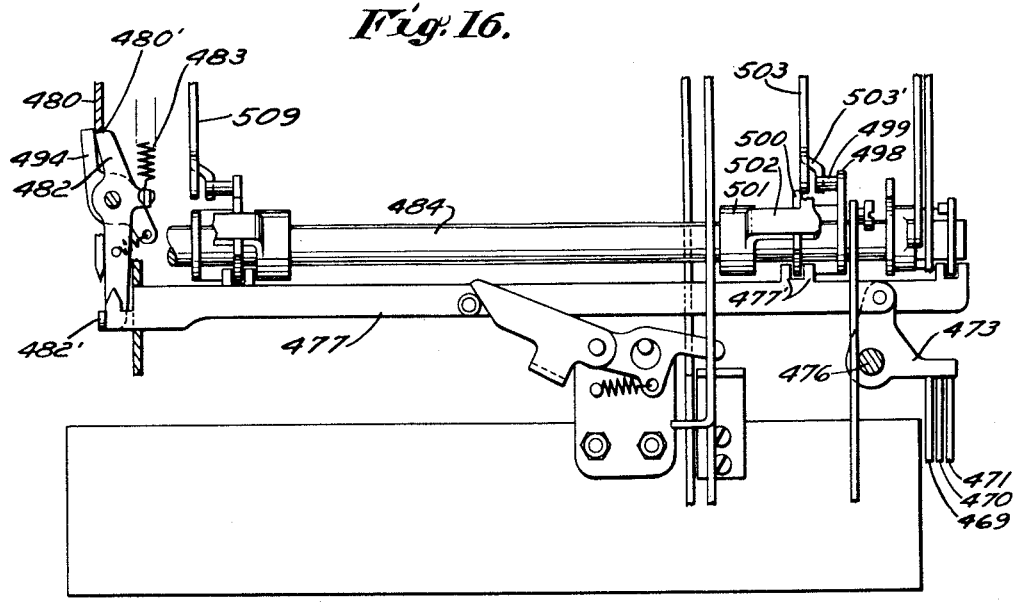
Fig. 16 is a fragmentary plan view of certain portions of the clearout mechanism.
Figure 17:
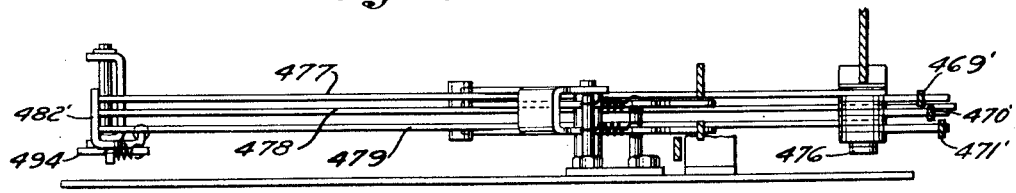
Fig. 17 is a front elevation of the parts shown in Fig. 16.

As described in the foregoing, the transfer is effected by a clearout operation for product wheels 13. According to the construction herein disclosed the machine is provided with a one cycle clutch 464 (Figs. 12 and 13) which is selectively operated to return to zero the upper dials 85 comprising the multiplier register, the lower dials 13 comprising the product register, or to restore any keys 18 which may be set on the keyboard 10. An upper dial clear key 465, a lower dial clear key 467 and a keyboard clear key 466 are grouped on the lower right hand side of the keyboard 10 (Fig. 1) to facilitate operation. A fourth key 468 completes the key group and the simultaneous depression of any one or more of clear keys 465, 466 and 467 with key 468 initiates a return left carriage shift after the carriage has been shifted to the right in a program of multiplication as will be described. Accordingly the depression of key 467 will initiate the clearout operation which will effect the transfer, and if depressed simultaneously with key 468 a left carriage return will also be initiated. The depression of any one of the keys 465, 466 or 467 serves to engage the clutch 464 and to select the operation it will perform. The keys, however, are adapted to be depressed simultaneously, whereby the clutch 464 will make a single cycle of operation to simultaneously clear the indicated dials and/or keyboard, as follows:

The stems of the clear keys 465, 466 and 467 (Fig. 14) are attached each at its lower end to the forward end of a lever, the respective levers 469, 470 and 471 being pivotally mounted, one behind the other, at their rear on a stud 472 fixed on the right hand side frame. Lever 471 is shown in its entirety in Fig. 14 and levers 469 and 470 are of like configuration. The levers 469, 470 and 471 are provided with depending arms which terminate in horizontally disposed fingers 469', 470' and 471' respectively, which are adapted for contact each with an arm of bell cranks 473, 474 and 475 respectively. The bell cranks are pivotally mounted on a vertical shaft 476 (Figs. 17 and 18) suitably fixed and depending from a cut out section of the right hand side frame. The bell cranks 473, 474 and 475 are connected to slides 477, 478 and 479 respectively which extend across the machine (Figs. 16, 17 and 18). Thus depression of any one of the clear keys 465, 466 or 467 will rock its associated lever counterclockwise (Fig. 14) about the stud 472 and the finger 469', 470' or 471' will rock bell crank 473, 474 or 475 counterclockwise thus moving slide 477, 478 or 479 to the left. The movement of any one of the slides to the left either singly or simultaneously with either one or both of the other slides releases a double latch 482 (Fig. 16) which allows the clearout clutch 464 to be engaged and selects the operation or operations to be powered by the clearout clutch. The double latch 482 which is normally in engagement with a shoulder 480' of a slide 480, holds said slide in its rearward position against the tension of a spring 481 (Fig. 12). The slide 480 is slidably supported at its forward end on a shaft 484 which extends across the machine and projects externally of the left hand side frame. The slide is attached at its rearward end to an arm 485 fixed on shaft 486, which is rotatably mounted in the side frame. The leftward ends of slides 477, 478 and 479 are in abutment with an upstanding ear 482' of latch 482 (Figs. 16 and 17). Thus, movement of one or more of the slides to the left will rock latch 482 clockwise about its pivot against tension of spring 483, releasing slide 480, which will be pulled forward by its spring 481. The left hand ends of the slides 477, 478 and 479 are each provided with a recess and when a slide is moved to its active position, the forward end of released slide 480 will enter such recess and hold the slides 477, 478 or 479 in set position until the engaging end of slide 480 has been removed in the restoration of said slide to latch position.

Clearout clutch 464 (Figs. 12 and 13) is driven by a suitable gear train 464' from the electric motor and is of well-known construction in which a spring pawl mounted on the driven member of the clutch is held out of engagement with the driving member by a detent. For this purpose a detent 487 is fixed on shaft 486 and when the slide 480 is released and pulled forward by its spring, the shaft 486 through arm 485 will be rocked counterclockwise, thus removing detent 487 from engagement with the pawl of clutch 464, thereby engaging the drive to the motor. Upon engagement of the clearout clutch the circuit breaker for the electric motor must be closed. For this purpose, a lever 490, pivotally mounted on the frame is urged counter clockwise by a suitable spring. A horizontally disposed arm of the lever 490 (Figs. 13 and 19) is in contact with a pin on the arm 200 and the lever is restrained from rotation by a lug 491 on the slide 480 in blocking contact with a depending arm of the lever 490. When the slide 480 is released to move forward, the lever 490 is urged counterclockwise by its spring and the forward end of lever 200 is lifted to close the circuit breaker.

Figure 13:
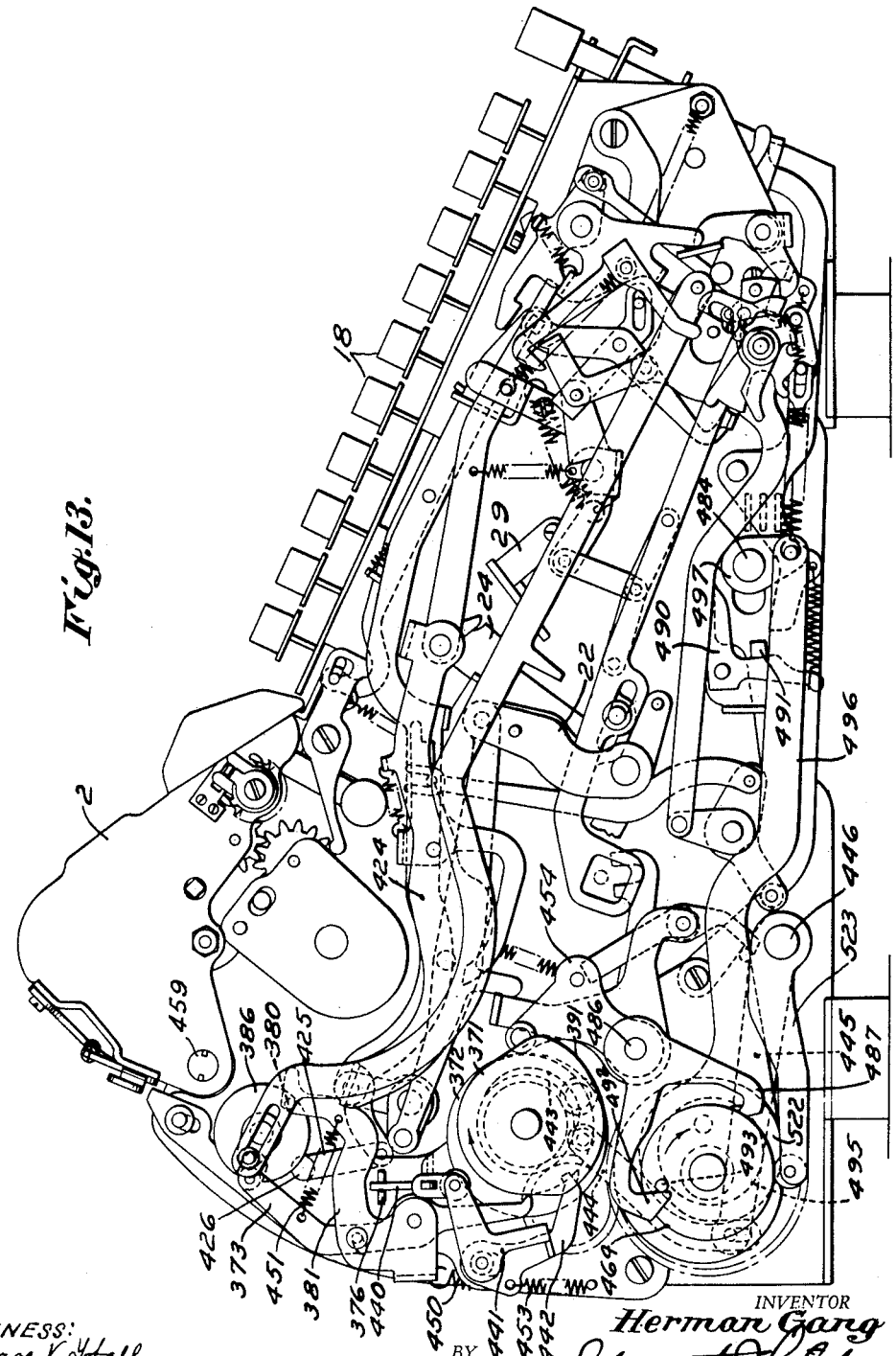
Fig. 13 is a left side elevation of the machine showing the various parts in their normal position.

In order that the clutch 464 will make one cycle of operation and then be disengaged, provision is made to return the detent 487 into position to engage the pawl of the clutch before the clutch has completed its cycle. To this end, the detent 487 is provided with an extension 492, the free end of which is provided with a cam face 492' (Figs. 12 and 13). When the detent 487 is disengaged (Fig. 12), the free end of the arm 492 is moved downwardly, thus bringing the cam face 492' into position to be engaged by a pin 493 mounted on the driven member of the clutch 464. As the clutch 464 approaches its full cycle position, the pin 493 will contact cam face 492' raising arm 492 and thus moving detent 487 into position where it will engage the pawl of the clutch 464 and disconnect the drive when the clutch reaches full cycle position. As the detent 487 is fast on shaft 486, the shaft will be rocked clockwise, carrying arm 485 with it and moving slide 480 to the rear. The pin 493 of clutch 464 will pass under the cam face 492' providing sufficient movement of slide 480 to bring the shoulder 480' to the rear of the restraining arm of latch 482, which will be urged into latching position by spring 483. The slide 480 will then be urged forward by its spring into contact with the latch 482 and the arm 492 moved slightly downward (Figs. 13 and 16). The latch 482 operates as above described only if the clear out keys 465, 466 and 467 have been released before the completion of the clear out cycle. If the clearout keys have been released, the ear 482' abutting the ends of the setting slides 477, 478 and 478 will move said slides to the right to their unset position. However, should a clear key be held depressed the related setting slide will be held to the left and by contact with ear 482' will hold the latch in clockwise rocked position, out of the path of the shoulder 480' of slide 480. In this instance a latch lever 494 having common pivotal mounting with latch 482 will be urged clockwise by spring connection with latch 482, thus positioning it in the path of the shoulder of slide 480 to prevent forward movement of the slide. When the clearout keys are released the latch 482 will be free to be moved counterclockwise by spring 483 and return the slides 477, 478 or 479 to normal. As latch 482 is moved counterclockwise, it will, by contact with latch 494, move the latter out of restraining engagement with slide 480 and will itself be moved into latching position, thereby taking over control of said slide (Fig. 16).

The clutch 464, during the foregoing cycle of operation, provides the power to operate the mechanism adjusted to active position by one or more of the setting slides 477, 478 and 479. To this end, the driven member of clutch 464 is provided with an eccentric cam 495 (Fig. 13). The eccentric cam is adapted to impart a reciprocatory movement to a link 496 which is attached at its forward end to a crank arm 497 fixed on the shaft 484 which extends across the machine (Figs. 16 and 18). Thus when clutch 464 is operated, the shaft 484 is rocked clockwise (Fig. 13; counterclockwise Fig. 18) during the first half of the cycle and during the second half of the cycle is rocked back to normal.

Slidably mounted on shaft 484 and positioned to the left of the right hand side frame, is a rearwardly extending arm 498 (Figs. 11, 16 and 18) having a pin 499 extending to the left thereof. Integral with arm 498 and positioned to the left in spaced relationship thereto is a member 500 provided with an upstanding portion having an open end slot. Further to the left and fixed on shaft 484, is a collar 501 provided with an arm 502 extending to the right thereof and seated in the open end slot of member 500. Pivotally mounted on shaft 446 is a lever 503 similar to lever 509 (Fig. 11), the forward end of lever 503 being provided with an open end slot the bottom of which is defined by an ear 503', offset to the right (Fig. 16). Normally the forward end of lever 503 is held downwardly by a rearwardly extending finger 502' (Fig. 18) of the extension 502 of collar 501, the pin of lever 498 being positioned just above and out of contact with the ear 503'. However, depression of clearout key 465, initiating the operation which will restore the upper dials 85 to zero will, as heretofore described, move setting slide 477 to the left. Slide 477 is provided with a projection 477' (Figs. 16 and 18) having an open end slot which engages the rim of member 500. Thus member 500 and arm 498 are moved to the left bringing the pin of said arm into engagement with the forward end of lever 503. When shaft 484 is rocked by clearout clutch 464, arm 498 will therefore be rocked, through arm 502 of collar 501, thus raising the forward end of the lever 503. The rearward end of lever 503 is connected to the bottom of a link 504 (Figs. 11 and 18) which is attached at its upper end to an arm 505 splined on the carriage shaft 459' and provided with a suitable bearing in the right hand side frame (Fig. 5). Thus, as the rearward end of lever 503 is lowered, shaft 459' will be rocked clockwise and, through suitable linkage 506, shaft 507 mounted in the carriage will likewise be rocked clockwise. The rocking of shaft 507 will serve to return to zero the wheels 85 (Fig. 2) in the manner fully disclosed in Patent No. 1,781,320 issued to L. P. Crosman on November 11, 1930. As shaft 484 is rocked clockwise back to normal, the pin of arm 498 by contact with ear 503' will move the forward end of lever 503 downwardly and at the end of the movement the finger 502' will further depress said lever, lowering ear 503' slightly below the pin of arm 498, at which time slide 477 will be restored to its normal position if key 465 has been released. However, if key 465 is held depressed, the restoration of the slide will take place upon release of said key.

The parts adjusted to active position by depression of key 467 and leftward movement of slide 479 for clearing the lower dials 13 to zero are of similar construction to those related to the upper dials. An arm 508 (Figs. 11 and 16), provided with a pin, is moved into driving engagement with a lever 509, the lever being driven by an arm of a collar 510 which is fixed on shaft 484. The rearward end of lever 509 is attached to a link 511 (Figs. 18 and 20) which is attached to an arm 512 (Fig. 20) splined on the carriage shaft 459 provided with a suitable bearing in the left hand side frame of the machine. When shaft 459 is rocked clockwise, shaft 513 will, through suitable linkage 514 likewise be rocked clockwise and the wheels 13 (Fig. 2) be zeroized in accordance with the above mentioned Patent No. 1,781,320.

As it is necessary that the intermediate gears in the carriage 2 be out of mesh with the intermediate gears in the machine body (Fig. 2) when wheels 13 are cleared, a clearout cycle of clutch 464 operates to raise the forward end of the carriage. A cam 522 (Fig. 13) rotated with the driven member of clutch 464 serves to depress an arm 523 at the beginning of a clearout cycle. Arm 523 is fast on shaft 446 and as said shaft is rocked counterclockwise the carriage 2 is lifted through arms 447, links 448 and lifters 449 (Fig. 20). As clutch 464 approaches its full cycle position, arm 523 (Fig. 13) is allowed to move upwardly as spring 457 (Fig. 21) rocks arm 458, fast to shaft 446, thereby pulling the carriage downwardly into its normal position.

When carriage 2 is raised in the clearout operation, provision is made to rock shaft 527, thereby removing pawls 693 from engagement with storage gears 540 so that they may be more easily driven in the transfer operation.

Crank 707 (Figs. 6 and 20) is splined on shaft 527 and extends forwardly between two spaced plates 708 which are mounted on and extend upwardly from the left hand side frame. Plates 708 are provided with a pin extending therebetween and through an open end slot in the end of crank 707. Crank 707 is, therefore, held against lateral movement by plates 708 when carriage 2 is shifted. However, when carriage 2 is raised in the clearout operation, the pin in engagement with the slot of crank 707 will hold the forward end of the crank from upward movement. Therefore as shaft 527 is raised with carriage 2, crank 707 will be rocked counterclockwise (Fig. 20) and, due to the splined mounting, will also rock shaft 527 in the same direction. As shaft 527 is rocked in accordance with the foregoing, cams 695 splined thereon will be rocked clockwise (Fig. 4) to the position shown therein and into contact with pawls 693, thereby rocking the pawls out of engagement with storage gears 540.

When storage gears 540 have been counted back to zero in the multiplying operation bails 640 and 641 are allowed clockwise movement (Fig. 8) by engagement of the respective fingers 543 with recesses 542 of the hubs of the storage gears 540. Thus, fingers 543 also operate to restrain gears 540. Provision is therefore made to rock bails 640 and 641 counterclockwise in the clearout operation, thereby releasing fingers 543 as well as pawls 693. Any suitable power means timed with the clearout and transfer operation may be used to rock bails 640 and 641 counterclockwise. For example the means fully disclosed in my copending application Serial No. 8,548, hereinbefore referred to, in which the bails are rocked by operation of the clearout clutch may be used for this purpose.

*Carriage shift mechanism*

The carriage shift devices herein disclosed embody operational features substantially as set forth in Pat. No. 2,419,760 issued to E. F. Britten, Jr., on April 29, 1947. However, means are included for lifting the carriage to partly unmesh the intermediate gears therein from those in the body of the machine for purposes of clearance prior to initiation of a shift. Also a means is shown whereby the shift is terminated when either of the shift keys is held depressed until the carriage is shifted into either of its extreme positions.

Figure 25:
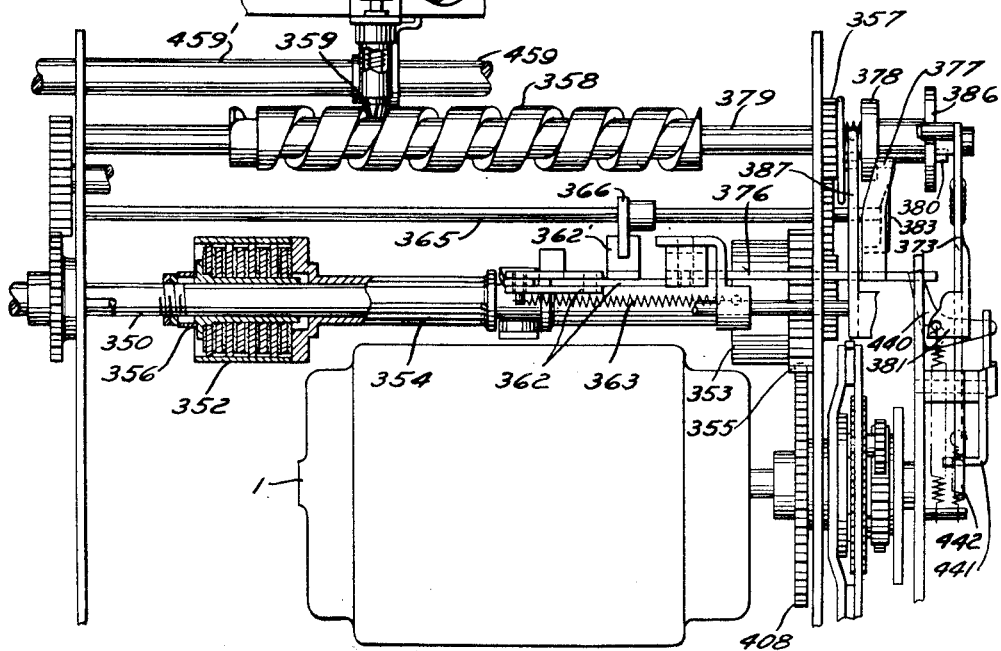
Fig. 25 is an elevation and partial section of portions of the carriage shift and actuator drive and control mechanism as viewed from the rear of the machine.

As herein disclosed and as set forth in the above mentioned patent, the means which control the extent and direction of actuator movement are utilized to control the extent and direction of shift of the carriage 2. For this purpose two friction clutches 352 and 353 are provided, as shown in Fig. 25, the driving elements of these clutches being connected for rotation as a unit by a sleeve 354. The driving elements of clutches 352 and 353 are connected to the output gear 408 of the differential gear drive by means of a gear 355 secured to the driving member of clutch 353. The driven member of clutch 352 consists of a sleeve 356, fast upon shaft 350, a series of friction disks being interposed between the driving member of the clutch and the driven member 356. Normally clutch 352, connecting the drive to the actuators to the output of the differential, is held engaged under spring tension.

Clutch 353, which is normally disengaged, has a driven member similar to member 356 of clutch 352 except that it is freely supported on shaft 350 and is provided with gearing connection 357 to the carriage drive worm 379. The carriage is mounted at its ends and center on the aligned shafts 459 and 460; which are slidably and pivotally mounted in the framing of the machine. Worm 358 is engaged by a spring plunger 359 depending from carriage 2, the carriage thus being shifted to the right or to the left upon rotation of the worm 358 in one or the other direction.

Figure 26:
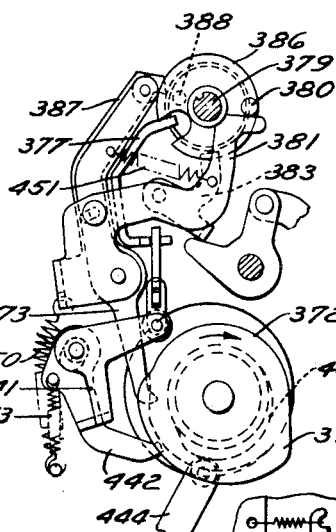
Fig. 26 is a detailed fragmentary left side elevation of portions of the carriage shift and actuator drive control mechanism.

Sleeve 354 is moved to the right or to the left, and is held under spring tension in either shifted position, to engage clutch 352 or clutch 353, by means of a toggle arrangement best shown in Figs. 11 and 25 and fully disclosed in the aforementioned Patent No. 2,419,760. A shifting arm 360 is provided with anti-friction rollers engaging between flanges of sleeve 354, and is pivoted at one end to a link 361, having pivotal connection to the machine framing, and at the other end has connection with one link of a toggle 362, the far end of this toggle being also pivotally secured to a bracket rigidly mounted on a fixed shaft extending between the side frames of the machine. In normal position of the parts, toggle 362 is fully extended, holding arm 360 (Fig. 11) against the tension of spring 363 (Fig. 25) in position to engage clutch 352, in which position the clutch is yieldably held engaged under the tension of a spring 364 connected to link 361. In order to disengage clutch 352 and engage clutch 353, means are provided for breaking the toggle 362, thereby allowing spring 363 to move sleeve 354 to the right as viewed in Fig. 25, in which position clutch 353 will be held engaged under tension of spring 364. For breaking the toggle, a shaft 365 is adapted to be rocked clockwise (Fig. 11) and is provided with a finger 366 which will unset the toggle through contact with a lug 362' thereof. Shaft 365 is rocked by depression of the right shift key 369 or left shift key 370 as follows:

These keys 369 and 370 are mounted in the machine frame closely adjacent to the plus bar 120 and minus bar 121 (Figs. 1 and 14). Right shift key 369 has a shoulder overlying a stud 397 carried by the stem of plus bar 120, and left shift key 370 has a shoulder overlying a stud 398 in the stem of minus bar 121, both keys extending downward and having a slot and pin connection with a lever 368 (Figs. 21, 24 and 27). Pivotally mounted on the rear end of lever 368 and spring biased toward the front of the machine is arm 367 provided with a shoulder 367' (Figs. 27 and 28) and at the free end thereof with a plunger 438, the function of which will be later described. Fixed on shaft 365, extending through the frame of the machine, is latch lever 439 the forward end of which is provided with a bent over portion normally overlying the shoulder 367' on latch arm 367 and with a nose portion to the rear which acts as a stop by contact with shaft 426. Depression of the right shift key 369 will, therefore, effect depression of the plus bar 120, effecting additive drive from the differential to the driving members of friction clutches 352 and 353; and conversely negative drive from the differential will be effected by depression of the left shift key 370 which will effect depression of the minus bar 121. At the same time, depression of either of these shift keys will depress the forward end of lever 368 (Fig. 27) and raise its rearward end with the arm 367 attached thereto. This movement will rock lever 439 and shaft 365 clockwise by contact of shoulder 367' with the bent over portion of said lever, breaking the toggle 362 and engaging shift clutch 353, at which time clutch 352 is disengaged. Although drive to the shift worm 359 is thus effected, clutch 352 will slip momentarily and the worm 358 will be held locked against rotation while a one cycle clutch 371 (Figs. 12 and 13) makes a partial rotation, comprising a relatively short step in the cycle, to effect lifting of the carriage 2 to provide clearance during the shift, as follows:

When toggle 362 is broken to initiate a shift, a link 376 connected to a crank extension of one of the toggle links will be moved to the right (Fig. 25). The end of the link has slot connection with the upper arm of a bell crank 440 the other arm of which has link connection to one arm of another bell crank 441 (Figs. 12 and 13). Depending arm of crank 441 is provided with a slot which engages a detent 442, which is spring urged to normally engage a pawl of clutch 371 and hold it disengaged. The clutch is driven through suitable gearing by the electric motor 1. Upon movement of slide 376, the bell crank 440 will therefore be rocked and accordingly the bell crank 441 will lift detent 442, against tension of spring 453, out of engagement with the pawl of clutch 371, to engage the drive. A second detent 373 normally rests against the periphery of the driven member of clutch 371 and has pin and slot connection with tripping arm 381. A spring 450 urges arm 381 counterclockwise and thus urges detent 373 in the same direction. An upwardly extending arm of the detent 373 is provided with a roller which normally engages a slot in the disk 386, secured to a sleeve which is splined to shaft 379 of the shifting worm 358. Thus the worm is held against rotation until the clutch 371 has rotated a distance which allows the detent 373 to engage the pawl of clutch 371 and to interrupt the drive (Fig. 26). When the detent 373 moves inwardly to disengage clutch 371, the upwardly extending arm of the detent disengages its roller from the slot in disk 386, permitting the engaged shift clutch 353 to drive the shifting worm 358.

The above described step in the cycle of rotation of clutch 371 effects lifting of the carriage 2 through a cam 443 secured to the driven member of the clutch (Figs. 13 and 26). A link 444, provided with a roller at its upper end in contact with the cam 443 and guided by a slot in the framing of the machine (not shown), is moved downwardly by rotation of said cam (Fig. 26). Link 444 is attached through pin and slot connection to the end of arm 445, fixed on a shaft 446 extending across the machine. Downward movement of link 444 will thus rock shaft 446 counterclockwise (Fig. 13; clockwise Fig. 20) against the tension of a spring attached to arm 458 fixed on said shaft (Fig. 21). Fixed on shaft 446 are a pair of arms 447 (one of which is shown in Fig. 20) having link connections 448 with a pair of carriage lifters 449. The carriage lifters are provided with slots at their forward ends by which they are pivotally mounted on pins on the inner side of the right and left side frames of the machine respectively. The rearward ends of the lifters 449 are provided with hook end portions adapted to fit under and over an inwardly turned shelf located at the front and extending the length of the carriage 2.

Rocking of shaft 446 will, therefore, raise arms 447 and through the link connections raise the carriage lifters, thereby lifting the carriage about its rear pivoted support to partly unmesh the intermediate gears in the carriage from those in the body of the machine. As will be readily understood, the carriage will be in sliding engagement with the lifters during the shift, at which time they perform the function of supports and guides. Also, it will be seen that the lift cam 443 is arrested in its rotation (Fig. 26), in position to hold the carriage in raised position during the shift, which will be continuous as long as a shift key is held depressed or until the carriage has been shifted into either of its extreme positions.

Release of shift key 369 or 370 will bring about the termination of the shift, whereupon the one cycle clutch 371 will complete its cycle for the purpose of normalizing the several parts. To this end, when toggle 362 is broken to intiate a shift, adjustment of the mechanism takes place as follows:

When toggle 362 is broken a link 376 (Fig. 25) is moved to the right, as heretofore described, carrying an arm 377, integral therewith, out of restraining engagement with a disk 378, fixed upon a sleeve which is splined to the shaft 379 of the shifting worm 358. A disk 386 secured to the opposite end of this sleeve is provided with a pin 380 (Figs. 25 and 26), normally lying to the left of a tripping arm 381, pivotally mounted coaxially with clutch detent 373. The detent 373 and tripping arm 381 have pin and slot connection and an upstanding arm of the detent has a spring 451' connected to the tripping arm, urging the members toward one another to the limit of the pin and slot connection. As heretofore described, the arm of the detent 373 has a roller which normally engages a slot in disk 386 and is removed therefrom when the detent acts to arrest the rotation of the clutch 371, following its engagement, by lifting the detent 442 from engagement with the pawl of the clutch. A spring urges disk 378 and the associated parts toward the right (Fig. 25), but the disk is restrained, after the removal of the restraint of arm 377, by engagement with a crank arm 383, more clearly shown in Fig. 19, secured upon shift initiating shaft 365, which shaft is rocked upon depression of a shift key and thus rocks the arm 383 into the path of movement of the disk 378. As movement of the disks 378 and 386 to the right acts to terminate the shift, restraining crank arm 383 provides for continuous shifting until the carriage has reached its extreme position or until the shift key is released.

Upon release of the shift key, shaft 365 will be restored by counterclockwise rotation of lever 439 (Fig. 21), under the influence of spring 452, thereby removing crank 383 from the path of disk 378. Spring urged disk 378 will now move to the right as viewed in Fig. 25, and with it disk 386 and pin 380, until blocked by contact with tripping arm 381. As shaft 379 of worm 358 completes its cycle of operation, pin 380 will contact one of the two opposed cam faces of tripping arm 381 (Fig. 26), rocking said arm clockwise against the tension of spring 450 and putting detent 373 under tension of spring 451, thereby biasing the roller of the arm of said detent against the periphery of disk 386. This relative movement between the tripping arm 381 and detent 373 is allowed by the pin and slot connection therebetween. As this movement reaches its maximum, the shift worm reaches its full cycle position, at which time the slot in disk 386 is in registration with the roller on the arm of detent 373 and said roller is urged to enter the slot by tensioned spring 451. In order to insure this action and prevent the worm from running past full cycle position, tripping arm 381 is provided with an extension 387. When the tripping arm is moved by pin 380, the extension 387 is moved into the path of a pin 388, which is fixed in a disk rotating with shaft 379, thereby preventing movement of the shaft beyond full cycle position. As the shaft may be rotating in either direction, pin 388 may engage extension 387 on either side thereof, for which reason the disk to which pin 388 is fixed has pin and slot lost motion driving connection with gear 357, fast on shaft 379. When the roller on the arm of detent 373 enters the slot in disk 386, said detent is removed from engagement with the pawl of clutch 371, permitting the reengagement of the clutch, to complete its cycle of operation to normalize the several parts. In this connection, it will be noted that the toggle 362 must be reset to disengage the friction clutch 353 and engage clutch 352 and that the clutch lever 111 (Fig. 19) must be disengaged. Also the carriage must be lowered to its normal position. Furthermore, it will be observed that, although the plus or minus bar is depressed and released with the shift key, arm 22 will not rock during a shifting operation, and therefore the tripping of the trigger 31, as the plus or minus bar is released, will be ineffective. Disengagement of clutch lever 111, lowering of the carriage and resetting of toggle 362 is accomplished by the clutch 371 as follows:

Cams 372 and 391 are secured to the driven member of clutch 371. Upon rotation of clutch 371 in its second step of movement, cam 391 (Fig. 26) will engage a roller on an arm of bell crank 441, rocking the crank counterclockwise, thereby through the link connection rocking bell crank 440 counterclockwise (Fig. 25) to move the slide 376 to the left and reset the toggle 362. Also detent 442 will now be urged inwardly by spring 453. When slide 376 is moved to the left, disk 386 and pin 380 are removed from engagement with tripping arm 381, allowing the arm to be rocked counterclockwise by spring 450 and urging detent 373, through the pin and slot connection, against the periphery of the driven member of clutch 371. In this connection, it will be noted that the roller on the arm of detent 373 will be moved outwardly from the bottom of the slot in disk 386 but will not be removed therefrom, thus holding the shift worm 358 in locked full cycle position (Fig. 13).

During this second step of rotation of the clutch 371, the clutch lever 111 will be restored to its neutral position by operation of cam 372. To this end, arm 454, pivotally mounted on the frame of the machine, is provided with a roller held in contact with cam 372 by action of a spring attached to the lever. A second arm 455 (Fig. 12), having common pivotal mounting with arm 454, is provided with a latch the upstanding end of which is normally in the path of movement of a pin in arm 454, so that arm 455 will be rocked in unison with arm 454. Arm 455 will, therefore, be rocked clockwise (Figs. 12 and 13) upon rotation of clutch 371 in its second step of movement. An upstanding extension of arm 455 will thus contact a lug on link 424 attached to the full cycle arm 24 at its forward end and move the link toward the front of the machine, rocking arm 24 clockwise about its pivot, raising the cam extension 144 (Fig. 19) into contact with the pin 145 of clutch lever 111, and thereby centralizing the clutch lever. At this point, it will be noted that the circuit breaker in the motor circuit has been broken, and although clutch 371 has not yet reached its full cycle position, cams 372 and 391 have completed their work and the clutch through momentum will be free to coast to the completion of its cycle, where the drive will be disengaged by detent 442. Also, clutch 353 is still in engagement when the shift worm 358 is stopped and therefore a momentary slippage of the clutch will take place as toggle 362 is being reset. Furthermore, as the clutch 371 completes its cycle of operation it will be seen that the cam 443 will allow the carriage 2 to be lowered to its normal position under the urge of spring 457 (Fig. 21).

Should the right shift key 369 or left shift key 370 be held depressed until the carriage is shifted into either of its extreme positions, shift initiating shaft 365 will be restored to normal, whereby the drive is terminated in the same manner as described when the shaft 365 is restored to normal by release of the shift key. For this purpose, two lugs 460 (Figs. 27, 28 and 29) are located on the rear of the carriage and so spaced that the nose of a plunger 438 mounted on arm 367 is positioned just below one or the other of the lugs when the carriage is in either of its extreme shifted positions. Should the carriage be in the extreme right hand position for example and the left shift key be depressed (Fig. 27), the plunger, which is spring urged to its normal position, will be depressed by contact with the lug 460 when arm 367 is raised and the shift initiated. When the carriage has shifted from the extreme right hand position the lug 460 will be removed from contact with the plunger 438 and said plunger will return to its extended position. As the carriage is shifted into the extreme left hand position, the nose of the plunger will ride outward on the inclined edge 460' of the lug 460, moving arm 367 to the rear against the tension of its spring (Fig. 28). This movement of arm 367 will remove shoulder 367' from restraining engagement with latch lever 439, allowing the lever and shaft 365 to be moved counterclockwise to normal and thus terminating the shift. When the shift key is finally released, the plunger 438 will drop below lug 460 and arm 367 will be urged forward by its spring, locating the shoulder 367' in its normal position below the forward end of latch lever 439. Termination of the shift at the extreme position in the opposite direction is, as will be readily understood, accomplished in the same manner. Should a shift key be depressed while the carriage is in the extreme position of the indicated shift, a shifting action will be initiated, but as the plunger 359 is at the end of worm 358 the drive will be ineffective to move the carriage. However, the plunger 359, which is yieldably held within the groove of the worm 358, will be raised to ride over the outer diameter of the worm by the eccentric conformation of the worm at either end, as will be seen in Figs. 5, 11 and 25.

*Transfer and carriage location*

When the transfer from the product register to the multiplier storage devices is effected as heretofore described, by depression of clear key 467 (Fig. 1), the simultaneous depression of key 468 therewith will operate to bring about automatic depression of left shift key 370 during the clearout cycle. Carriage 2 will therefore be shifted to its leftmost position, in accordance with the foregoing description of the carriage shift keys and mechanism. Sub-carriage 525 will also be returned to its normal latched position and the units order storage gear 540 will be brought into the plane of movement of the counting finger 626, as heretofore described.

Although the transfer and carriage return operation will be effected upon simultaneous depression of keys 467 and 468 only, it is usually desirable to depress key 465 therewith so that the multiplier dials 85 will be cleared. Since any set keys 18 on keyboard 10 may be released upon the conclusion of a program of multiplication, as fully disclosed in my co-pending application Serial No. 8,548 hereinbefore referred to, it is unnecessary to depress key 466 to clear the machine for another operation. It may be well to note at this point that depression of key 468 alone will not effect the carriage shift but that the depression must be simultaneous with that of one or more of the clear keys 465, 466 and 467. The operation is effected as follows:

In connection with a clearout cycle effected by keys 465, 466 or 467 as described, shaft 484 (Figs. 14 and 18) is rocked counterclockwise and then clockwise back to normal, the first movement being effective to clear the indicated wheels or keyboard. A crank 602 (Figs. 14 and 18) fixed on shaft 484 has yieldable link connection 603 with a depending crank 604 which is integral with a rearwardly disposed hub of an arm 605. The hub of arm 605 is provided with a circumferential slot and is rotatably mounted and adapted for lateral displacement on a stub shaft 606 extending outwardly from the right hand side frame. A pin in the end of a forwardly extending arm of a rocker 597 is located in the slot of the hub of arm 605 and acts to position said arm laterally into or out of the vertical plane of a pin 370' (Fig. 15) of left shift key 370. Rocker 597 is pivotally mounted on a bracket of the right hand side frame of the machine and is biased by a spring 596 (Figs. 2 and 18) to move arm 605 out of its neutral position. Spring 596 is secured at its upper end to a slide 595, its lower free end passing through a hole in a leftwardly extending arm of rocker 597.

For the purposes of the present description it may be assumed that slide 595 is permanently located to the rear of the position illustrated in Fig. 18, in the position illustrated in dotted lines in Fig. 2, so that spring 596 tends to rotate rocker 597 clockwise, bringing arm 605 into the plane of pin 370'.

However, rocker 597 is normally held in neutral position, against the pressure of spring 596, by a lever 598 (Fig. 21). Lever 598 is pivotally mounted on stud 550 which extends outwardly from the right hand side frame, said lever being provided with a recess 598' in the lower edge thereof. When the rearward end of lever 598 is held downwardly by spring 599, a rightwardly extending arm of rocker 597 is positioned within recess 598', preventing movement of the rocker out of neutral position.

When a clearout cycle is initiated by depression of one of the keys 465, 466 or 467, shaft 484 through crank 602, link 603 and crank 604 will rock arm 605 clockwise (Fig. 14) to a position above pins 369' and 370' and back counterclockwise to normal without contacting the said pins. However, when key 468 (Fig. 21) is depressed simultaneously with keys 465 and 467 to effect the carriage return set-up operation, a lever 607 having connection at its forward end with the lower end of the stem of key 468 is rocked counterclockwise about its pivot on stud 550. Lever 607 is disposed to the rear of lever 598 and has at its rearward end a lug 607' (Figs. 21 and 22) which underlies and is normally in contact with the lower edge of lever 598. Thus, when lever 607 is rocked counterclockwise, lever 598 is likewise rocked by lug 607'.

A latch 611 (Figs. 21 and 22) is provided to hold lever 598 in rocked position during the clearout cycle which will initiate the carriage shift. This is necessary since release of key 468 (Fig. 21) prior to completion of the clearout cycle would allow recess 598' of lever 598 to reengage the arm of rocker 597, thus holding the rocker in its central position and preventing the initiation of the carriage shift, as will appear. Bell cranks 473 and 475 (Fig. 18) are rocked counterclockwise upon depression of clearout keys 465 and 467 respectively as described in connection with the clearout operation. Outwardly extending arms of the bell cranks are thus moved to the right (Fig. 22) and by contact with a depending arm of a lever 612 will rock the lever counterclockwise about its pivot, against the tension of a suitable spring. Lever 612 is provided with another arm which has spring connection with a forwardly extending arm of latch 611. Thus when lever 598 is rocked, latch 611 (Fig. 22) will be urged clockwise beneath lug 610, holding lever 598 in rocked position when lever 607 (Figs. 21 and 22) is restored by release of key 468.

When lever 598 (Fig. 22) has been rocked as described, recess 598' is removed from restraining engagement with the outwardly extending arm of rocker 597 and spring 596 (Fig. 18), which is conditioned to move rocker 597 in a clockwise direction, will act accordngly. However, as rocker 597, through its pin connection, moves arm 605 to the left (Figs. 15 and 18) on shaft 606, no appreciable movement is effected, as the leftward face of arm 605 is brought into abutment with the pin 370' of the stem of the right shift key 370 (Fig. 15). As shaft 484 (Figs. 14 and 18) is rocked counterclockwise in the clearout operation, arm 605 is rocked clockwise by the link connection 603, whereby the arm is raised above the pin 370' of left shift key 370. Accordingly, arm 605 is allowed further movement to the left until restrained by the stem of key 370. As shaft 484 is rocked clockwise back to normal, arm 605 will be rocked counterclockwise and therefore, by engagement with the upper s'de of the pin 370' of left shift key 370, will pull said key downwardly (Fig. 24) and latch it in depressed position, thereby initiating a left carriage shift.

Furthermore, as the clearout cycle is completed, the arms of bell cranks 473 and 475 (Fig. 24) will be moved to the left and therefore lever 612 will be rocked clockwise by its spring to normal position, thus removing latch 611 from engagement with lug 610 of lever 598. However, when rocker 597 (Fig. 18) was moved clockwise, the outwardly extending arm thereof was moved to the left (Fig. 24) of recess 598' of lever 598. Accordingly, when lever 598 is released by latch 611, the lower edge of the lever to the left of recess 598' will be brought to rest upon the outwardly extending arm of rocker 597. Thus lever 598 is held in rocked position.

Carriage 2 will be shfted to the leftmost position where lug 460, fixed on the carriage, will contact with plunger 438 (Fig. 28), thereby terminating the shift in accordance with the operation of the carriage shift mechanism described in connection w:th operation of shift keys 369 and 370.

Arm 24 (Figs. 12 and 19) is carried against the fixed stop 29 upon termination of the carriage shift as also described in connection with the carriage shift mechanism. Link 424 (Fig. 12), attached at its forward end to arm 24 and at its rear to crank 425 fixed on shaft 426, is therefore moved toward the front of the machine and thus rocks shaft 426 counterclockwise. Shaft 426 extends across the machine and has suitable link connection 427 (Fig. 27) with arm 429 and therefore arm 429 is rocked in counterclockwise direction.

Rocker 597 (Fig. 18) is provided with an open end slot extending to and flaring outwardly at the rear. As arm 429 is rocked counterclockwise an extension 429' thereof will contact the walls of the flared entrance, entering the slot of rocker 597 and moving it counterclockwise to its central position. Rocker 597 will therefore move arm 605 to the right (Figs. 15 and 18) out of latching engagement with pin 370' of the left shift key 370, thereby releasng said key. Furthermore, the outwardly extending arm of rocker 597 will be moved to the right from the position shown in Fig. 24, and the rear end of lever 598 will be moved downwardly by spring 599 to engage recess 598' with the outwardly extending arm of rocker 597. Thus when arm 24 (Figs. 12 and 19) is returned from the fixed stop 29 and arm 429 (Fig. 27) is restored to normal, rocker 597 will be locked by lever 598 (Fig. 21) in its central position.

I claim:

1. In a calculating machine having a fixed frame, a main carriage mounted on and transversely shiftable relative to said frame, a product register on said carriage and including a denominational series of numeral wheel gears, and a counting finger on said frame; a sub-carriage mounted upon and longitudinally shiftable relative to the main carriage, a denominational series of multiplier storage gears on said sub-carriage, an abutment on the main carriage limiting movement of the sub-carriage in one direction and serving to locate said sub-carriage normally in position with the multiplier storage gears out of mesh with the product gears and with one or another of said storage gears in the plane of movement of the counting finger, a device engageable by the sub-carriage upon shifting movement thereof and serving to locate said sub-carriage in a selected position wherein the storage gears will be in mesh with product gears of selected denominational orders, and means operable to rotate the product wheels to zero registering position and thereby transfer registered values to the shifted multiplier gears.

2. In a calculating machine having a fixed frame, a main carriage mounted on and transversely shiftable relative to said frame, a product register on said carriage and including a denominational series of numeral wheel gears, and a counting finger on said frame; a sub-carriage mounted upon and longitudinally shiftable relative to the main carriage, a denominational series of multiplier storage gears on said sub-carriage, a latch normally holding said sub-carriage in position with the multiplier storage gears out of mesh with the product gears and with one or another of said storage gears in the plane of movement of the counting finger, a selectively adjustable stop device mounted on the main carriage and designed to stop shifting movement of the sub-carriage in a position thereof wherein the storage gears will be in mesh with product gears of selected denominational orders, means operable to unlatch and shift the sub-carriage against the stop device, and means operable to rotate the product wheels to zero registering position and thereby transfer registered values to the shifted multiplier storage wheels.

3. In a calculating machine having a fixed frame, a main carriage mounted on and transversely shiftable relative to said frame, a product register on said carriage and including a denominational series of numeral wheel gears, and a counting finger on said frame; a sub-carriage mounted upon and longitudinally shiftable relative to the main carriage, a denominational series of multiplier storage gears on said sub-carriage, an abutment on the main carriage limiting movement of the sub-carriage in one direction and serving to locate said sub-carriage normally in position with the multiplier storage gears out of mesh with the product gears and with one or another of said storage gears in the plane of movement of the counting finger, a device engageable by the sub-carriage upon shifting movement thereof and serving to locate said sub-carriage in a selected position wherein the storage gears will be in mesh with product gears of selected denominational orders, means operable to rotate the product wheels to zero registering position and thereby transfer registered values to the shifted multiplier gears, means operable to shift the main carriage into one extreme position, and a contact member mounted on the fixed frame and engageable by the sub-carriage during said shifting operation and effective to relocate the sub-carriage in normal relation to the main carriage.

4. In a calculating machine having a fixed frame, a main carriage mounted on and transversely shiftable relative to said frame, power means operable to shift said carriage, a product register on said carriage and including a denominational series of numeral wheel gears, and a counting finger on said frame; a sub-carriage mounted upon and longitudinally shiftable relative to the main carriage, a denominational series of multiplier storage gears on said sub-carriage, an abutment on the main carriage limiting movement of the sub-carriage in one direction and serving to locate said sub-carriage normally in position with the multiplier storage gears out of mesh with the product gears and with one or another of said storage gears in the plane of movement of the counting finger, a device engageable by the sub-carriage upon shifting movement thereof and serving to locate said sub-carriage in a selected position wherein the storage gears will be in mesh with product gears of selected denominational orders, clearout means operable to rotate the product wheels to zero registering position and thereby transfer registered values to the shifted multiplier gears, manipulable key devices acting to initiate operation of the clearout means, a normally inactive lever train adjusted to active condition by the key devices and operable by the clearout means to initiate operation of the power shifting means, and a contact member mounted on the fixed frame and engageable by the sub-carriage during said shifting operation and effective to relocate the sub-carriage in normal relation to the main carriage.

5. In a calculating machine having a fixed frame, a main carriage transversely shiftable relative to said frame, and a product register on said carriage including a denominational series of numeral wheel gears; a sub-carriage shiftable transversely relative to said frame and longitudinally relative to said main carriage, a denominational series of multiplier storage gears on said sub-carriage, means for locating said sub-carriage in a normal position wherein said storage gears are out of mesh with said product gears, means operable to shift said sub-carriage to a selected position wherein the storage gears will be in mesh with the product gears of selected denominational orders, and means operable to rotate the product wheels to zero registering position when in mesh with said storage gears and thereby transfer registered values to the multiplier storage gears.

6. A calculating machine according to claim 5 wherein the sub-carriage is mounted upon the main carriage, and said sub-carriage shifting means includes means cooperable with a selectively adjustable stop device on the main carriage to locate said sub-carriage in said selected position.

7. A calculating machine according to claim 6, having a series of denominational banks of digit keys mounted on the fixed frame, numeral wheels connected with the storage gears, and a decimal marker for said numeral wheels and for said banks of digit keys, integral with the adjustable stop device.

8. A calculating machine according to claim 5 wherein the sub-carriage is mounted upon the main carriage, and provided with a contact member on the fixed frame engageable with said sub-carriage when said main carriage is in one extreme shifted position, said contact member serving when said main carriage is shifted into said extreme position to shift the sub-carriage into and to hold the same in contact with the locating means.

HERMAN GANG.

REFERENCES CITED

The following references are of record in the file of this patent:

UNITED STATES PATENTS

| Number | Name | Date |
|---|---|---|
| 1,209,857 | Landsiedel | Dec. 26, 1916 |
| 1,336,904 | Hopkins | Apr. 13, 1920 |
| 1,590,920 | Wernecke | June 29, 1926 |
| 2,173,635 | Pott | Sept. 19, 1939 |
| 2,376,997 | Friden et al. | May 29, 1945 |
| 2,379,877 | Britten, Jr. | July 10, 1945 |
| 2,382,661 | Pott | Aug. 14, 1945 |